(12) United States Patent
Han et al.

(10) Patent No.: US 12,153,754 B2
(45) Date of Patent: Nov. 26, 2024

(54) DISPLAY DEVICE

(71) Applicant: LG Display Co., Ltd., Seoul (KR)

(72) Inventors: Jonghyun Han, Seoul (KR);
DongHoon Lee, Daegu (KR);
Younggyu Moon, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/520,139

(22) Filed: Nov. 27, 2023

(65) Prior Publication Data

US 2024/0220040 A1 Jul. 4, 2024

(30) Foreign Application Priority Data

Dec. 29, 2022 (KR) .................. 10-2022-0189378

(51) Int. Cl.
*G06F 3/045* (2006.01)
*G06F 3/041* (2006.01)
*G06F 3/044* (2006.01)

(52) U.S. Cl.
CPC .......... *G06F 3/0412* (2013.01); *G06F 3/0446* (2019.05); *G06F 3/0448* (2019.05)

(58) Field of Classification Search
CPC .. G06F 3/0412; G06F 3/04164; G06F 3/0443; G06F 3/0446; G06F 3/0448; G06F 2203/04111; G06F 2203/04112
See application file for complete search history.

(56) References Cited

U.S. PATENT DOCUMENTS

| | | | | |
|---|---|---|---|---|
| 11,442,587 B2* | 9/2022 | Song | .................. | G06F 3/04164 |
| 11,755,134 B2* | 9/2023 | Bok | ........................ | H10K 50/86 |
| | | | | 345/174 |
| 11,768,397 B2* | 9/2023 | Huang | ................ | G06F 3/04164 |
| | | | | 345/173 |
| 2013/0257785 A1* | 10/2013 | Brown | ................ | G06F 3/04182 |
| | | | | 345/174 |

(Continued)

FOREIGN PATENT DOCUMENTS

| | | | |
|---|---|---|---|
| KR | 10-2020-0042664 A | | 4/2020 |
| KR | 10-2022-0070664 A | | 5/2022 |
| KR | 20220070664 A | * | 5/2022 |

*Primary Examiner* — Joe H Cheng
(74) *Attorney, Agent, or Firm* — Birch, Stewart, Kolasch & Birch, LLP

(57) ABSTRACT

Discussed is a display device including a substrate having a display area and a non-display area in the display area, light-emitting elements disposed in the display area, an encapsulation unit covering the light-emitting elements, a plurality of touch-sensing electrodes on the encapsulation unit in the display area and extending in a first direction, and a plurality of touch-driving electrodes on the encapsulation unit in the display area and extending in a second direction different from the first direction, in which the plurality of touch-sensing electrodes include a plurality of sub-touch-sensing electrodes spaced apart from each other, and in which at least one sub-touch-sensing electrode, which is adjacent to the non-display area among the plurality of sub-touch-sensing electrodes, is configured as a first variant electrode having a shape different from a shape of a remaining sub-touch-sensing electrode except for the at least one sub-touch-sensing electrode among the plurality of sub-touch-sensing electrodes.

20 Claims, 8 Drawing Sheets

(56) References Cited

U.S. PATENT DOCUMENTS

| | | | |
|---|---|---|---|
| 2014/0225859 A1* | 8/2014 | Badaye | G06F 3/0446 |
| | | | 345/174 |
| 2017/0147128 A1* | 5/2017 | Ishizaki | G06F 3/0445 |
| 2021/0064187 A1* | 3/2021 | Lee | G06F 3/0412 |
| 2024/0004494 A1* | 1/2024 | Bang | G06F 3/04164 |
| 2024/0118765 A1* | 4/2024 | Lee | H10K 59/88 |
| 2024/0168583 A1* | 5/2024 | Kim | G06F 3/0446 |

* cited by examiner

DISPLAY DEVICE

CROSS-REFERENCE TO RELATED APPLICATIONS

This application claims priority to Korean Patent Application No. 10-2022-0189378 filed on Dec. 29, 2022, in the Korean Intellectual Property Office, the entire disclosure of which is hereby expressly incorporated by reference into the present application.

BACKGROUND

Field

The present disclosure relates to a display device, and more particularly, to a display device capable of improving touch performance.

Discussion of the Related Art

Recently, displays devices for visually expressing electrical information signals have been developed with the advent of the information age. Therefore, various display devices, which are thin in thickness and light in weight, and have excellent performances such as low power consumption, have been developed. Specific examples of the display devices can include a liquid crystal display (LCD) device, a plasma display panel (PDP) device, a field emission display (FED) device, and an organic light-emitting display (OLED) device.

The display device can include an input device to allow a user to input information by touching a display screen with a finger or a pen while watching the display screen. For example, a touch sensor for detecting a touch input can be used in a state of being attached to one surface of the display device or integrated with the display device. In addition, the display devices have been developed with additional cameras, speakers, sensors, and the like mounted therein.

SUMMARY OF THE DISCLOSURE

An object to be achieved by the present disclosure is to provide a display device capable of compensating for an area of a touch electrode lost by a through-hole by changing area ratios between some sub-touch-sensing electrodes or some sub-touch driving electrodes.

Another object to be achieved by the present disclosure is to provide a display device capable of compensating for an area of a touch electrode lost by a through-hole by increasing effective areas of some sub-touch-sensing electrodes or some sub-touch driving electrodes.

Objects of the present disclosure are not limited to the above-mentioned objects, and other objects, which are not mentioned above, can be clearly understood by those skilled in the art from the following descriptions.

According to an aspect of the present disclosure, a display device includes a substrate including a display area and a non-display area in the display area; a plurality of light-emitting elements disposed in the display area; an encapsulation unit covering the plurality of light-emitting elements; a plurality of touch-sensing electrodes on the encapsulation unit in the display area and extending in a first direction; and a plurality of touch-driving electrodes on the encapsulation unit in the display area and extending in a second direction different from the first direction, in which the plurality of touch-sensing electrodes includes a plurality of sub-touch-sensing electrodes spaced apart from each other, and in which at least one sub-touch-sensing electrode, which is adjacent to the non-display area among the plurality of sub-touch-sensing electrodes, is configured as a first variant electrode having a shape different from a shape of the remaining sub-touch-sensing electrode.

According to another aspect of the present disclosure, a display device includes: a substrate including a display area and a non-display area; a plurality of light-emitting elements disposed in the display area; a plurality of touch-sensing electrodes in the display area and extending in a first direction; and a plurality of touch-driving electrodes in the display area and extending in a second direction different from the first direction, wherein the plurality of touch-sensing electrodes are separated from the plurality of touch-driving electrodes by gaps extending in directions different from the first direction and the second direction, and wherein the at least two adjacent touch-sensing electrodes among the plurality of touch-sensing electrodes are separated by a boundary extending in the first direction.

Other detailed matters of the example embodiments are included in the detailed description and the drawings.

According to the present disclosure, some of the plurality of sub-touch-sensing electrodes or the plurality of sub-touch-driving electrodes included in the touch electrode are configured as the variant electrodes, which can suppress the degradation of touch sensing sensitivity.

According to the present disclosure, the floating electrode is formed only in some of the plurality of sub-touch-sensing electrodes or the plurality of sub-touch-driving electrodes, which can improve the touch sensing sensitivity.

The effects according to the present disclosure are not limited to the contents exemplified above, and more various effects are included in the present disclosure.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENTS

Figure 1:
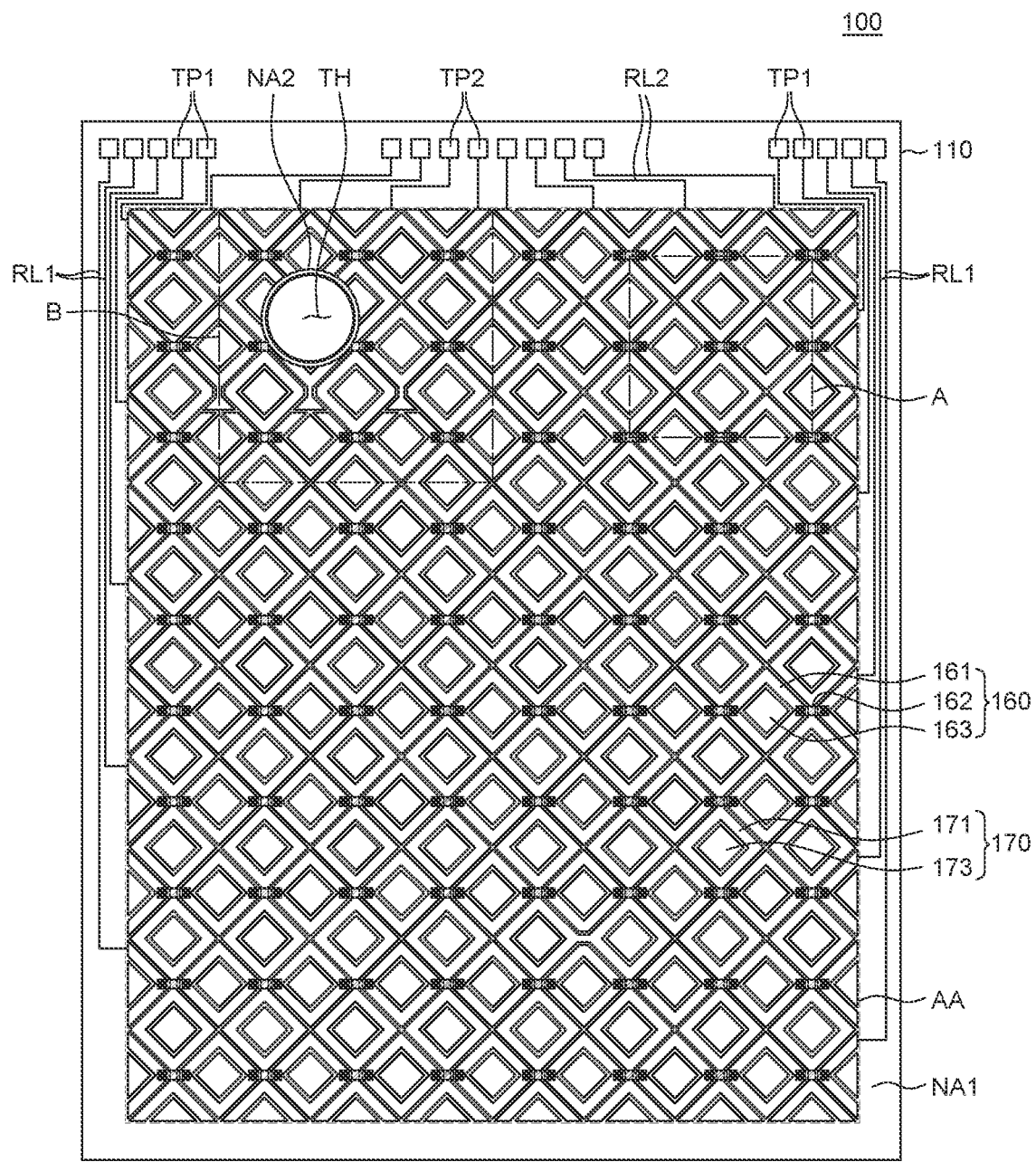
FIG. 1 is a schematic top plan view of a display device according to an example embodiment of the present disclosure.

Advantages and characteristics of the present disclosure and a method of achieving the advantages and characteristics will be clear by referring to example embodiments described below in detail together with the accompanying drawings. However, the present disclosure is not limited to the example embodiments disclosed herein but will be implemented in various forms. The example embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the example embodiments of the present disclosure are merely examples, and the present disclosure is not limited thereto. Like reference numerals generally denote like elements throughout the disclosure. Further, in the following description of the present disclosure, a detailed explanation of known related technologies can be omitted to avoid unnecessarily obscuring the subject matter of the present disclosure. The terms such as "including," "having," and "comprising" used herein are generally intended to allow other components to be added unless the terms are used with the term "only". Any references to singular can include plural unless expressly stated otherwise.

Components are interpreted to include an ordinary error range even if not expressly stated.

When the position relation between two parts is described using the terms such as "on", "over", "above", "below", and "next", one or more parts can be positioned between the two parts unless the terms are used with the term "immediately" or "directly".

When an element or layer is disposed "on" or "over" another element or layer, one or more additional layers or elements can be interposed directly on the other element or layer or therebetween.

Although the terms "first", "second", and the like are used for describing various components, these components are not confined by these terms. These terms are merely used for distinguishing one component from the other components and may not define order or sequence. Therefore, a first component to be mentioned below can be a second component in a technical concept of the present disclosure.

Like reference numerals generally denote like elements throughout the disclosure.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, the present disclosure will be described in detail with reference to accompanying drawings. All components of each display device according to all embodiments of the present disclosure may be operatively coupled and configured.

FIG. 1 is a schematic top plan view of a display device according to an example embodiment of the present disclosure. FIG. 1 illustrates only a substrate 110, a plurality of touch electrodes 160 and 170, a plurality of touch routing lines RL1 and RL2, and a plurality of touch pads TP1 and TP2 among constituent elements of a display device 100. But embodiments of the present disclosure are not limited thereto in that other components can be included in various implementations of the substrate or the display device.

With reference to FIG. 1, the display device 100 according to the example embodiment of the present disclosure includes the substrate 110, the plurality of touch electrodes 160 and 170, the plurality of touch routing lines RL1 and RL2, and the plurality of touch pads TP1 and TP2.

The substrate 110 is a support member for supporting other components of the display device 100 and can be made of an insulating material. For example, the substrate 110 can be made of glass, resin, or the like. In addition, the substrate 110 can include plastic such as polymer or polyimide (PI) and can be made of a material having flexibility. But embodiments of the present disclosure are not limited thereto.

The substrate 110 includes a display area (active area) AA, a first non-display area (first non-active area) NA1, and a second non-display area (second non-active area) NA2.

The display area AA is an area in which images are displayed. The display area AA can include a plurality of subpixels configured to display images, and a drive circuit configured to operate the plurality of subpixels. The plurality of subpixels can each be an individual unit configured to emit light, and light emitting elements 130 to be described below can be disposed in the plurality of subpixels, respectively. The plurality of subpixels can include a red subpixel, a green subpixel, a blue subpixel, and a white subpixel. However, the present disclosure is not limited thereto. The drive circuit can include various transistors, storage capacitors, and lines for operating the plurality of subpixels. For example, the drive circuit can include various constituent elements such as a driving transistor, a switching transistor, a sensing transistor, a storage capacitor, a gate line, and a data line. However, the present disclosure is not limited thereto.

The first non-display area NA1 is an area in which no image is displayed. The first non-display area NA1 is disposed to surround the display area AA or can be adjacent to the display area AA. The first non-display area NA1 is an area in which various lines, pads, drive ICs, and the like are disposed to operate the plurality of subpixels and the plurality of touch electrodes 160 and 170 disposed in the display area AA. For example, various drive ICs such as a gate drive part, a data drive part, and a touch drive part can be disposed in the first non-display area NA1.

The second non-display area NA2 is an area in which no image is displayed. The second non-display area NA2 is disposed in the display area AA. The second non-display area NA2 can be an area in which the light-emitting element 130 and the plurality of touch electrodes 160 and 170 are not disposed. The second non-display area NA2 can include a through-hole TH. The through-hole TH can be a hole that passes through the substrate 110. The through-hole TH can be formed to correspond to a camera or an optical sensor. But embodiments of the present disclosure are not limited thereto.

The plurality of touch electrodes 160 and 170 are disposed in the display area AA. The plurality of touch electrodes 160 and 170 can include a plurality of touch-sensing electrodes 160 and a plurality of touch-driving electrodes 170. The plurality of touch-sensing electrodes 160 and the plurality of touch-driving electrodes 170 can be disposed such that some of the plurality of touch-sensing electrodes 160 and some of the plurality of touch-driving electrodes 170 intersect one another. For example, the plurality of touch-sensing electrodes 160 and the plurality of touch-driving electrodes 170 can be disposed such that some of the plurality of touch-sensing electrodes 160 and some of the plurality of touch-driving electrodes 170 overlap one another.

The plurality of touch-sensing electrodes 160 and the plurality of touch-driving electrodes 170 can detect a touch input inputted to the display device 100. In this case, the touch input can be an input made by a user's finger or a touch pen. Specifically, in case that a touch operation is performed in a particular area of the display device 100, the capacitance can change between the plurality of touch-sensing electrodes 160 and the plurality of touch-driving electrodes 170 disposed adjacent to the particular area. The display device 100 can detect a touch coordinate by detecting a change in capacitance.

The plurality of touch-sensing electrodes 160 each extends in a first direction. The plurality of touch-sensing electrodes 160 can be spaced apart from one another at predetermined intervals in a second direction different from the first direction. Therefore, the plurality of touch-sensing electrodes 160, which is spaced apart from one another in the second direction, can be electrically insulated from one another. In this case, the first direction and the second direction can be directions that intersect each other. The first direction can be a horizontal direction based on FIG. 1, and the second direction can be a vertical direction based on FIG. 1. However, the present disclosure is not limited thereto. The touch-sensing electrodes 160 extending in the first direction can be separated in a particular area. Specifically, the plurality of touch-sensing electrodes 160 can be formed to be separated in an area in which the touch-sensing electrodes 160 and the touch-driving electrodes 170 overlap one another. The separated touch-sensing electrodes 160 can be connected by bridge electrodes 162.

The plurality of touch-driving electrodes 170 extends in the second direction. The plurality of touch-driving electrodes 170 can be continuously formed without being disconnected in the second direction. The plurality of touch-driving electrodes 170 can be spaced apart from one another at predetermined intervals in the first direction. Therefore, the plurality of touch-driving electrodes 170 spaced apart from one another in the first direction can be electrically insulated from one another.

The plurality of touch-sensing electrodes 160 and the plurality of touch-driving electrodes 170 can be disposed to be spaced apart from one another at predetermined intervals. Therefore, the plurality of touch-sensing electrodes 160 and the plurality of touch-driving electrodes 170 can be electrically separated from one another. The plurality of touch-sensing electrodes 160 and the plurality of touch-driving electrodes 170 can each have a metal mesh structure. The specific structures of the plurality of touch-sensing electrodes 160 and the plurality of touch-driving electrodes 170 will be described below with reference to FIGS. 2A and 2B. Meanwhile, in the present disclosure, the configuration has been described in which the plurality of touch-sensing electrodes 160 extends in the first direction, and the plurality of touch-driving electrodes 170 extends in the second direction. However, in other embodiments of the present disclosure, the plurality of touch-sensing electrodes 160 can extend in the second direction, and the plurality of touch-driving electrodes 170 can extend in the first direction.

The plurality of touch routing lines RL1 and RL2 is disposed in the first non-display area NA1. The plurality of touch routing lines RL1 and RL2 includes a plurality of first touch routing lines RL1 and a plurality of second touch routing lines RL2. The plurality of first touch routing lines RL1 can be electrically connected to the plurality of touch-sensing electrodes 160. The plurality of second touch routing lines RL2 can be electrically connected to the plurality of touch-driving electrodes 170. One end of each of the plurality of touch routing lines RL1 and RL2 can be connected to the plurality of touch electrodes 160 and 170, and the other end of each of the plurality of touch routing lines RL1 and RL2 can be connected to the plurality of touch pads TP1 and TP2.

The plurality of touch pads TP1 and TP2 is disposed in the first non-display area NA1. The plurality of touch pads TP1 and TP2 includes a plurality of first touch pads TP1 and a plurality of second touch pads TP2. The plurality of first touch pads TP1 can be electrically connected to the plurality of touch-sensing electrodes 160 through the plurality of first touch routing lines RL1. The plurality of second touch pads TP2 can be electrically connected to the plurality of touch-driving electrodes 170 through the plurality of second touch routing lines RL2. The touch drive part can be connected to the plurality of touch pads TP1 and TP2. Therefore, the plurality of touch pads TP1 and TP2 can receive a touch signal from the touch drive part or transmit a touch detection signal to the touch drive part.

The touch drive part can be connected to the plurality of touch electrodes 160 and 170 and transmit or receive signals. For example, the touch drive part can receive the touch detection signal from the plurality of touch-sensing electrodes 160. In addition, the touch drive part can transmit the touch driving signal to the plurality of touch-driving electrodes 170. The touch drive part can detect the touch by using mutual capacitance between the plurality of touch-sensing electrodes 160 and the plurality of touch-driving electrodes 170. For example, in case that a touch operation is performed on the display device 100, the capacitance can change between the plurality of touch-sensing electrodes 160 and the plurality of touch-driving electrodes 170. The touch drive part can detect the touch coordinate by detecting the change in capacitance.

Hereinafter, the display area AA of the display device 100 will be specifically described with reference to FIGS. 2A to 2C.

Figure 2A:
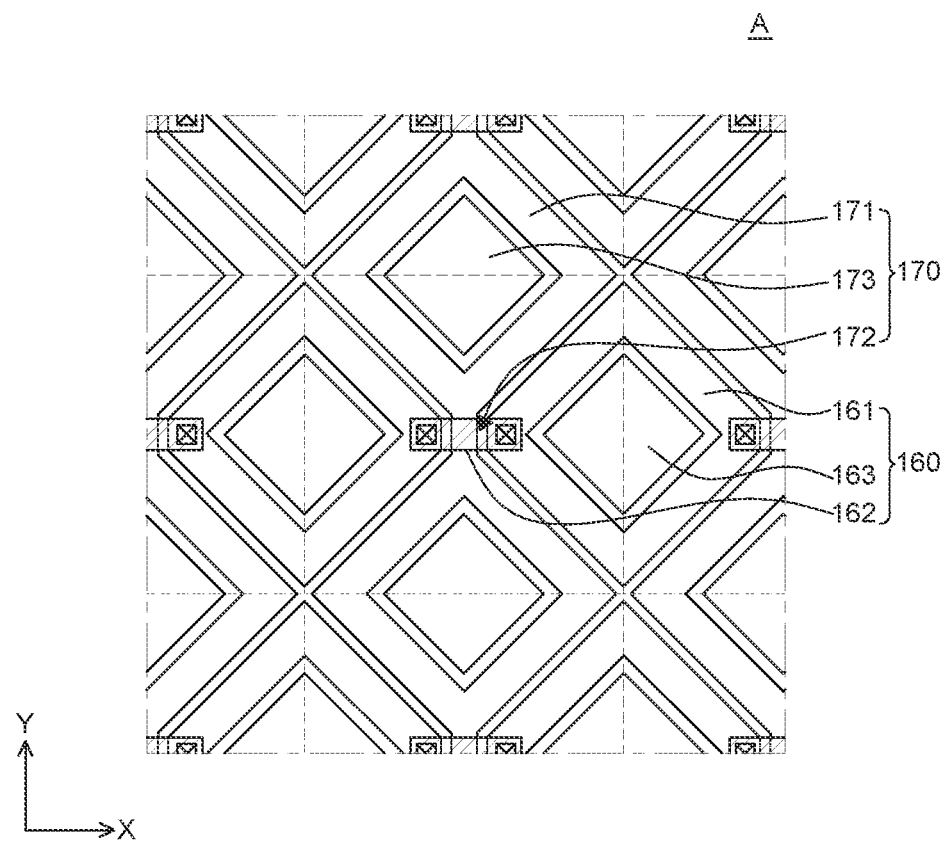
FIG. 2A is an enlarged view of part A in FIG. 1.

FIG. 2A is an enlarged view of part A in FIG. 1. FIG. 2B is a top plan view illustrating a mesh structure in FIG. 2A.

Figure 2B:
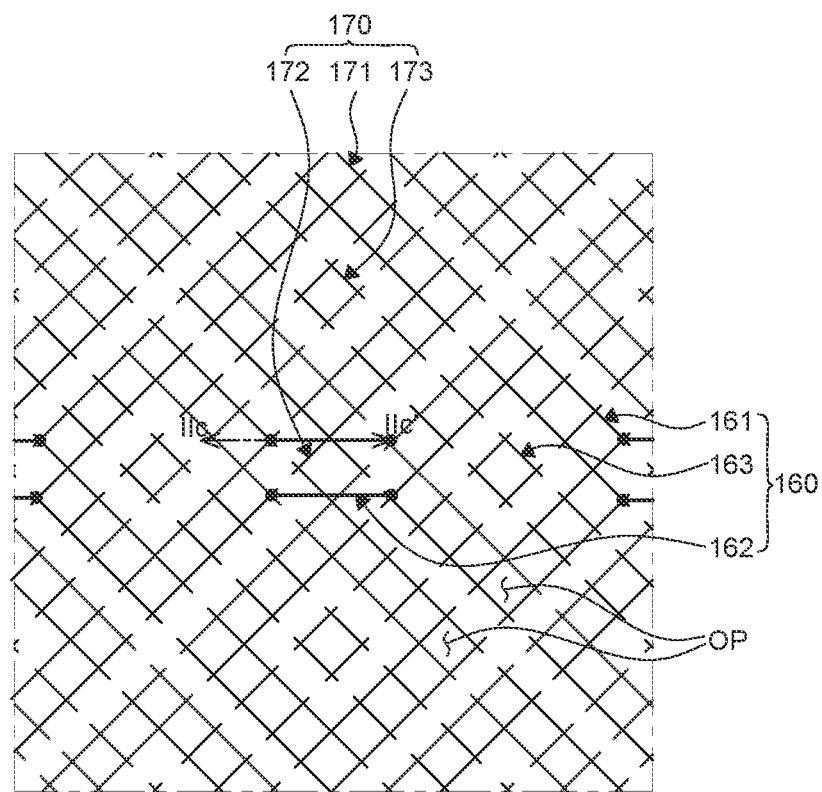
FIG. 2B is a top plan view illustrating a mesh structure in FIG. 2A.

With reference to FIGS. 2A and 2B, the plurality of touch-sensing electrodes 160 extends in the first direction, and the plurality of touch-driving electrodes 170 extends in the second direction. The plurality of touch-sensing electrodes 160 and the plurality of touch-driving electrodes 170 are disposed such that some of the plurality of touch-sensing electrodes 160 and some of the plurality of touch-driving electrodes 170 intersect one another. The plurality of touch-sensing electrodes 160 includes a plurality of sub-touch-sensing electrodes 161, a plurality of bridge electrodes 162, and a plurality of first floating electrodes 163. The plurality of touch-driving electrodes 170 includes a plurality of sub-touch-driving electrodes 171, a plurality of connection parts 172, and a plurality of second floating electrodes 173.

The plurality of sub-touch-sensing electrodes 161 can be disposed to be spaced apart from one another. In this case, the plurality of sub-touch-sensing electrodes 161, which are disposed on the same row in the first direction, can be electrically connected to one another by the plurality of bridge electrodes 162. The plurality of bridge electrodes 162 can be disposed on layers different from layers on which the plurality of sub-touch-sensing electrodes 161 is disposed. The plurality of bridge electrodes 162 can electrically connect the plurality of sub-touch-sensing electrodes 161 spaced apart from one another. The plurality of sub-touch-sensing electrodes 161 and the plurality of bridge electrodes 162, which are disposed on the same row, can be electrically connected to any one of the plurality of first touch routing lines RL1.

The plurality of sub-touch-driving electrodes 171 can be disposed to be spaced apart from one another. In this case, the plurality of sub-touch-driving electrodes 171, which is disposed on the same column in the second direction, can be electrically connected to one another by the plurality of connection parts 172. The plurality of sub-touch-driving electrodes 171 and the plurality of connection parts 172, which are disposed on the same column, can be integrated. For example, the plurality of connection parts 172 can be disposed on the same layer as the plurality of sub-touch-driving electrodes 171 and extend from the plurality of sub-touch-driving electrodes 171. The plurality of sub-touch-driving electrodes 171 and the plurality of connection parts 172, which are disposed on the same column, can be electrically connected to any one of the plurality of second touch routing lines RL2.

The plurality of sub-touch-sensing electrodes 161 and the plurality of sub-touch-driving electrodes 171 are disposed on the same layer and spaced apart from one another. The plurality of bridge electrodes 162 and the plurality of connection parts 172 are disposed in different layers and overlap one another. The plurality of bridge electrodes 162 and the plurality of connection parts 172 are disposed in an area in which the plurality of touch-sensing electrodes 160 and the plurality of touch-driving electrodes 170 intersect one another. Therefore, the plurality of touch-sensing electrodes 160 and the plurality of touch-driving electrodes 170 can be electrically insulated.

The plurality of first floating electrodes 163 is disposed in the plurality of sub-touch-sensing electrodes 161. The plurality of first floating electrodes 163 is electrically separated from the plurality of sub-touch-sensing electrodes 161. For example, the plurality of first floating electrodes 163 electrically floats from the plurality of sub-touch-sensing electrodes 161. Therefore, the plurality of first floating electrodes 163 can be electrically separated from the plurality of first touch routing lines RL1. The plurality of first floating electrodes 163 can be electrically grounded.

The plurality of second floating electrodes 173 is disposed in the plurality of sub-touch-driving electrodes 171. The plurality of second floating electrodes 173 is electrically separated from the plurality of sub-touch-driving electrodes 171. For example, the plurality of second floating electrodes 173 electrically floats from the plurality of sub-touch-driving electrodes 171. Therefore, the plurality of second floating electrodes 173 can be electrically separated from the plurality of second touch routing lines RL2. The plurality of second floating electrodes 173 can be electrically grounded.

The plurality of sub-touch-sensing electrodes 161 are disposed to surround the plurality of first floating electrodes 163. The plurality of sub-touch-driving electrodes 171 are disposed to surround the plurality of second floating electrodes 173. The plurality of sub-touch-sensing electrodes 161, the plurality of first floating electrodes 163, the plurality of sub-touch-driving electrodes 171, and the plurality of second floating electrodes 173 can each have an outer periphery having a rhombic shape. However, the present disclosure is not limited thereto. For example, in case that the plurality of sub-touch-sensing electrodes 161 and the plurality of first floating electrodes 163 are electrically separated and the plurality of sub-touch-driving electrodes 171 and the plurality of second floating electrodes 173 are electrically separated, the shapes and disposition structures thereof can be changed.

When an object, such as the finger, having static electricity comes into contact with the display device, the display device detects the touch input by detecting a change in mutual capacitance between the touch-sensing electrode and the touch-driving electrode at the contact point. Meanwhile, the intervals between the touch electrodes and the intervals between the finger and the touch electrodes can decrease as the display device is miniaturized or thinned. In this case, the finger can generate the parasitic capacitance on the other portions except for the contact point. The parasitic capacitance can cause retransmission in which the mutual capacitance changes on the other portion except for the contact point. As a result, the touch signal is generated on the other portions except for the contact point, or the touch signal generated on the other portions cancels out the touch signal generated at the contact point, which can cause a problem in which the touch cannot be recognized.

The plurality of first floating electrodes 163 and the plurality of second floating electrodes 173 can minimize the retransmission. For example, the plurality of first floating electrodes 163 and the plurality of second floating electrodes 173 can reduce the parasitic capacitance between the finger and the touch-sensing electrode 160 and between the finger and the touch-driving electrode 170. The capacitance is inversely proportional to a distance between two conductors opposite to each other and proportional to areas of the conductors. The first floating electrode 163, which is electrically separated from the sub-touch-sensing electrode 161, is disposed in the sub-touch-sensing electrode 161. The second floating electrode 173, which is electrically separated from the sub-touch-driving electrode 171, is disposed in the sub-touch-driving electrode 171. Therefore, an effective electrode area of each of the plurality of touch-sensing electrodes 160 and the plurality of touch-driving electrodes 170 can be decreased. For example, the effective electrode areas of the plurality of touch-sensing electrodes 160 can be decreased to a degree to which the areas of the plurality of first floating electrodes 163 are excluded. The effective electrode areas of the plurality of touch-driving electrodes 170 can be decreased to a degree to which the areas of the plurality of second floating electrodes 173 are excluded. Therefore, the parasitic capacitance can be decreased between the finger and the touch-sensing electrode 160 and between the finger and the touch-driving electrode 170, and the retransmission can be minimized.

Meanwhile, with reference to FIG. 2A, points at which the plurality of touch-sensing electrodes 160 and the plurality of touch-driving electrodes 170 intersect can be defined as nodes. For example, one node can be set as an area between the dotted lines in FIG. 2A. Specifically, the nodes can be set by a plurality of areas defined by imaginary connection lines configured to connect upper ends of the plurality of sub-touch-sensing electrodes 161, imaginary connection lines configured to connect lower ends of the plurality of sub-touch-sensing electrodes 161, imaginary connection lines configured to connect one end of each of the plurality of sub-touch-driving electrodes 171, and imaginary connection lines configured to connect the other end of each of the plurality of sub-touch-driving electrodes 171. Therefore, in one node, halves of the two adjacent sub-touch-sensing electrodes 161 can be disposed, and halves of the two adjacent sub-touch-driving electrodes 171 can be disposed. In addition, the bridge electrode 162 and the connection part 172 can be disposed at a center of the node. However, the definition of the node is not limited thereto.

A plurality of nodes can be continuously arranged in the first and second directions in the display device 100. The display device 100 can determine the touch coordinate by detecting a change in voltage occurring on the plurality of nodes. Specifically, when the touch operation is performed in a particular area, the capacitance changes between a part of the sub-touch-sensing electrode 161 and a part of the sub-touch-driving electrode 171 that are disposed adjacent to the particular area. Further, capacitance variation values can be calculated for some nodes disposed adjacent to the particular area, and a touch position can be determined on the basis of a combination of the capacitance variation values.

With reference to FIG. 2B, the plurality of touch-sensing electrodes 160 and the plurality of touch-driving electrodes 170 can each have a metal mesh structure. Specifically, the plurality of touch-sensing electrodes 160 and the plurality of touch-driving electrodes 170 can each include a mesh pattern defined by metal lines having very thin line widths intersecting with one another. The mesh pattern can have a single-layer or multilayer structure made of a metal material such as molybdenum (Mo), silver (Ag), titanium (Ti), copper (Cu), aluminum (Ti), titanium/aluminum/titanium (Ti/Al/Ti), and molybdenum/aluminum/molybdenum (Mo/Al/Mo). However, the present disclosure is not limited thereto.

Opening portions OP can be formed in the mesh patterns of the plurality of touch-sensing electrodes 160 and the plurality of touch-driving electrodes 170. The opening portions OP can correspond to the subpixels. For example, the light-emitting element 130 can be disposed in the opening portion OP. Hereinafter, the specific structure of the display device 100 will be described with reference to FIG. 2C.

Figure 2C:
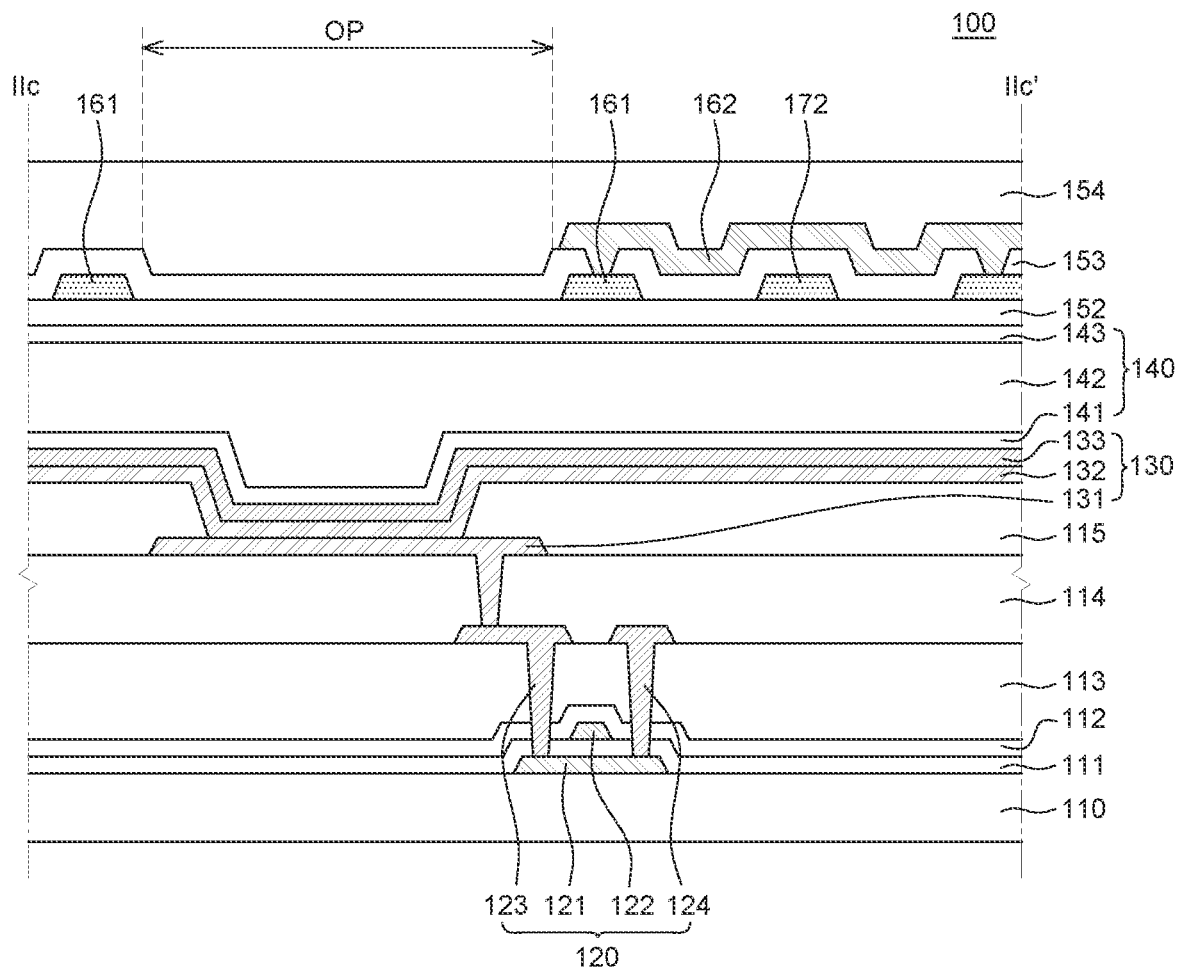
FIG. 2C is a cross-sectional view taken along line IIc-IIc' in FIG. 2B.

FIG. 2C is a cross-sectional view taken along line IIc-IIc' in FIG. 2B.

With reference to FIG. 2C, the display device 100 includes the substrate 110, a transistor 120, the light-emitting element 130, an encapsulation unit 140, the touch-sensing electrode 160, and the touch-driving electrode 170. But embodiments of the present disclosure are not limited thereto.

The transistor 120 is disposed on the substrate 110 and configured to operate the light-emitting element 130. The transistor 120 can include an active layer 121, a gate electrode 122, a source electrode 123, and a drain electrode 124. A buffer layer can be disposed between the substrate 110 and the transistor 120. The buffer layer can reduce the amount of moisture or impurities penetrating through the substrate 110. For example, the buffer layer can be configured as a single layer or multilayer made of silicon oxide (SiOx) or silicon nitride (SiNx). However, the present disclosure is not limited thereto.

The active layer 121 is disposed on the substrate 110. The active layer 121 is an area in which a channel is formed when the transistor 120 operates. The active layer 121 can include a channel area, a source area, and a drain area. The active layer 121 can be made of a semiconductor material such as an oxide semiconductor, amorphous silicon, or polysilicon. However, the present disclosure is not limited thereto.

A gate insulation layer 111 is disposed on the active layer 121. The gate insulation layer 111 is an insulation layer for insulating the active layer 121 and the gate electrode 122. The gate insulation layer 111 can be configured as a single layer or multilayer made of silicon oxide (SiOx) or silicon nitride (SiNx). However, the present disclosure is not limited thereto.

The gate electrode 122 is disposed on the gate insulation layer 111. The gate electrode 122 is disposed on the gate insulation layer 111 and overlaps the channel area of the active layer 121. The gate electrode 122 can be made of an electrically conductive material, for example, copper (Cu), aluminum (Al), molybdenum (Mo), nickel (Ni), titanium (Ti), chromium (Cr), or an alloy thereof. However, the present disclosure is not limited thereto.

A first interlayer insulation layer 112 and a second interlayer insulation layer 113 are disposed on the gate electrode 122. Contact holes, through which the source electrode 123 and the drain electrode 124 are connected to the active layer 121, are formed in the first interlayer insulation layer 112 and the second interlayer insulation layer 113. The first interlayer insulation layer 112 can be configured as a single layer or multilayer made of silicon oxide (SiOx) or silicon nitride (SiNx). However, the present disclosure is not limited thereto. The second interlayer insulation layer 113 can be made of an organic material. For example, the second interlayer insulation layer 113 can be configured as a single layer or multilayer made of polyimide or photo acryl. However, the present disclosure is not limited thereto.

The source electrode 123 and the drain electrode 124 are disposed on the second interlayer insulation layer 113 and spaced apart from each other. The source electrode 123 and the drain electrode 124 are electrically connected to the active layer 121 through the contact holes in the gate insulation layer 111, the first interlayer insulation layer 112, and the second interlayer insulation layer 113. The source electrode 123 and the drain electrode 124 can each be made of an electrically conductive material, for example, copper (Cu), aluminum (Al), molybdenum (Mo), nickel (Ni), titanium (Ti), chromium (Cr), or an alloy thereof. However, the present disclosure is not limited thereto.

A planarization layer 114 is disposed on the transistor 120. The planarization layer 114 is an insulation layer for planarizing an upper portion of the substrate 110. The planarization layer 114 has a contact hole through which the source electrode 123 of the transistor 120 is exposed. However, the planarization layer 114 can have a contact hole through which the drain electrode 124 is exposed. The planarization layer 114 can be configured as a single layer or multilayer made of an organic material, for example, polyimide or photo acrylic. However, the present disclosure is not limited thereto.

The light-emitting element 130 is disposed on the planarization layer 114. The light-emitting element 130 emits light in response to a data signal supplied from the transistor 120. The light-emitting elements 130 can be disposed to correspond to the opening portions OP defined by the mesh patterns of the plurality of touch-sensing electrodes 160 and the plurality of touch-driving electrodes 170. The light-emitting element 130 includes a first electrode 131, a light-emitting layer 132, and a second electrode 133. In this case, the first electrode 131 can be an anode electrode, and the second electrode 133 can be a cathode electrode.

Meanwhile, the display device 100 can be implemented as a top emission type or a bottom emission type. In the case of the top emission, a reflective layer can be disposed on a lower portion of the first electrode 131 and reflect light, which is emitted from the light-emitting layer 132, toward the second electrode 133. For example, the reflective layer can include a material excellent in reflectivity, such as aluminum (Al) or silver (Ag). However, the present disclosure is not limited thereto. On the contrary, in the case of the bottom emission type, the first electrode 131 can be made of only an electrically conductive transparent material. Hereinafter, the description will be made on the assumption that the display device 100 according to the example embodiment of the present disclosure is the top emission type.

The first electrode 131 is disposed on the planarization layer 114. The first electrode 131 can be connected to each of the plurality of subpixels. For example, the first electrode 131 can be disposed to correspond to the opening portion OP. The first electrode 131 can be electrically connected to the source electrode 123 of the transistor 120 through the contact hole formed in the planarization layer 114. In this case, because the first electrode 131 supplies positive holes to the light-emitting layer 132, the first electrode 131 can be made of an electrically conductive material having a high work function. For example, the first electrode 131 can be made of an electrically conductive transparent material such as indium tin oxide (ITO) or indium zinc oxide (IZO). However, the present disclosure is not limited thereto.

A bank 115 is disposed on the first electrode 131 and the planarization layer 114. The bank 115 can be formed on the planarization layer 114 and cover an edge of the first electrode 131. The bank 115 is an insulation layer disposed between the plurality of subpixels in order to divide the plurality of subpixels. The bank 115 can be made of an organic insulating material. For example, the bank 115 can be made of polyimide-based resin, acryl-based resin, or benzocyclobutene (BCB)-based resin. However, the present disclosure is not limited thereto.

The light-emitting layer 132 is disposed on the first electrode 131 and the bank 115. The light-emitting layer 132 can be formed over the entire surface of the substrate 110. For example, the light-emitting layer 132 can be a common layer formed in common in the plurality of subpixels. The light-emitting layer 132 can be an organic layer that emits light with a particular color. The light-emitting layer 132 can further include various layers such as a hole transport layer, a hole injection layer, a hole blocking layer, an electron injection layer, an electron blocking layer, and an electron transport layer.

The second electrode 133 is disposed on the light-emitting layer 132. The second electrode 133 can be a single layer formed over the entire surface of the substrate 110. For example, the second electrode 133 can be a common layer formed in common in the plurality of subpixels. Because the second electrode 133 supplies the electrons to the light-emitting layer 132, the second electrode 133 can be made of an electrically conductive material with a low work function. For example, the second electrode 133 can be made of a transparent electrically conductive material such as indium tin oxide (ITO) and indium zinc oxide (IZO) or made of a metal alloy such as MgAg or an ytterbium (Yb) alloy. The second electrode 133 can further include a metal doping layer. However, the present disclosure is not limited thereto.

The encapsulation unit 140 is disposed on the light-emitting element 130. The encapsulation unit 140 protects the light-emitting element 130 from moisture or the like penetrating from the outside of the display device 100. The encapsulation unit 140 includes a first encapsulation layer 141, a particle covering layer 142, and a second encapsulation layer 143.

The first encapsulation layer 141 can be disposed on the second electrode 133 and suppress the penetration of moisture or oxygen. The first encapsulation layer 141 can be made of an inorganic material such as silicon nitride (SiNx), silicon oxynitride (SiNxOy), or aluminum oxide (AlyOz). However, the present disclosure is not limited thereto.

The particle covering layer 142 is disposed on the first encapsulation layer 141 and planarizes a surface of the first encapsulation layer 141. In addition, the particle covering layer 142 can cover foreign substances or particles that can be produced during the manufacturing process. The particle covering layer 142 can be made of an organic material, for example, silicon oxycarbon (SiOxCz) or acrylic or epoxy-based resin. However, the present disclosure is not limited thereto.

The second encapsulation layer 143 can be disposed on the particle covering layer 142 and suppress the penetration of moisture or oxygen, like the first encapsulation layer 141. In this case, the second encapsulation layer 143 and the first encapsulation layer 141 can be formed to seal the particle covering layer 142. Therefore, the second encapsulation layer 143 can more effectively reduce the amount of moisture or oxygen penetrating into the light-emitting element 130. The second encapsulation layer 143 can be made of an inorganic material such as silicon oxide (SiOx), silicon nitride (SiNx), silicon oxynitride (SiNxOy), or aluminum oxide (AlyOz). However, the present disclosure is not limited thereto.

A touch buffer layer 152 is disposed on the encapsulation unit 140. For example, the touch buffer layer 152 is disposed on the second encapsulation layer 143. The touch buffer layer 152 can reduce the penetration of moisture or impurities. The touch buffer layer 152 can be configured as a single layer or multilayer made of silicon oxide (SiOx) or silicon nitride (SiNx). However, the present disclosure is not limited thereto.

The plurality of sub-touch-sensing electrodes 161 and the plurality of sub-touch-driving electrodes 171 are disposed on the touch buffer layer 152. The plurality of sub-touch-sensing electrodes 161 and the plurality of sub-touch-driving electrodes 171 can be disposed on the touch buffer layer 152 and spaced apart from one another at predetermined intervals. The plurality of sub-touch-sensing electrodes 161, which is adjacent to one another in the first direction, can be electrically connected by the plurality of bridge electrodes 162. In this case, the plurality of sub-touch-sensing electrodes 161 and the plurality of bridge electrodes 162 can be disposed on different layers. The plurality of sub-touch-driving electrodes 171, which is adjacent to one another in the second direction, can be electrically connected by the plurality of connection parts 172. In this case, the plurality of sub-touch-driving electrodes 171 and the plurality of connection parts 172 can be integrally formed on the touch buffer layer 152.

Meanwhile, in FIG. 2C, the plurality of first floating electrodes 163 and the plurality of second floating electrodes 173 are disposed on the touch buffer layer 152. The plurality of first floating electrodes 163 is disposed on the touch buffer layer 152 and spaced apart from the plurality of sub-touch-sensing electrodes 161. The plurality of second floating electrodes 173 is disposed on the touch buffer layer 152 and spaced apart from the plurality of sub-touch-driving electrodes 171.

A touch insulation layer 153 is disposed on the touch buffer layer 152, the plurality of sub-touch-sensing electrodes 161, the plurality of first floating electrodes 163, the plurality of sub-touch-driving electrodes 171, the plurality of connection parts 172, and the plurality of second floating electrodes 173. The touch insulation layer 153 can electrically insulate the plurality of connection parts 172 and the plurality of bridge electrodes 162. The touch insulation layer 153 can include contact holes through which the plurality of sub-touch-sensing electrodes 161 and the plurality of bridge electrodes 162 are connected to one another. The touch insulation layer 153 can be configured as a single layer or multilayer made of silicon oxide (SiOx) or silicon nitride (SiNx). However, the present disclosure is not limited thereto.

The plurality of bridge electrodes 162 is disposed on the touch insulation layer 153. The plurality of bridge electrodes 162 is disposed between the plurality of sub-touch-sensing electrodes 161 disposed adjacent to one another in the first direction. Therefore, the plurality of bridge electrodes 162 can electrically connect the plurality of sub-touch-sensing electrodes 161 spaced apart from one another. In addition, the plurality of bridge electrodes 162 can be disposed to overlap the plurality of connection parts 172. In this case, the plurality of bridge electrodes 162 and the plurality of connection parts 172 can be formed on different layers and thus electrically insulated.

A second touch planarization layer 154 is disposed on the touch insulation layer 153 and the plurality of bridge electrodes 162. The second touch planarization layer 154 can planarize upper portions of the plurality of touch-sensing electrodes 160 and upper portions of the plurality of touch-driving electrodes 170. The second touch planarization layer 154 can be made of an organic material. For example, the second touch planarization layer 154 can be configured as a single layer or multilayer made of polyimide or photo acryl. However, the present disclosure is not limited thereto.

With reference to FIG. 2A and in various embodiments of the present disclosure, in the configuration where the plurality of touch-sensing electrodes 160 extend in the first direction and the plurality of touch-driving electrodes 170 extend in the second direction, the plurality of touch-sensing electrodes 160 in a first row extending in the first direction can be separated from the plurality of touch-sensing electrodes 160 in a second row extending in the first direction by a gap that extends in directions different from the first direction and the second direction. For example, when the first direction is considered as an X-axis direction and the second direction is considered as a Y-axis direction, the extending direction of the gap can be diagonal or intersecting to the X-axis and/or Y-axis directions. In considering that the plurality of touch-driving electrodes 170 extend in the second direction, the plurality of touch-sensing electrodes 160 and the plurality of touch-driving electrodes 170 can also be separated by gaps extending in the directions different from the first direction and the second direction. In various embodiments of the present disclosure, the directions different from the first direction and the second direction can be referred to as a third direction and a fourth direction, and the third direction and the fourth direction can be perpendicular to each other. The gaps extending in the third direction and the gaps extending in the fourth directions can intersect at a plurality of crossing locations. In various embodiments of the present disclosure, an apex of a touch-driving electrode 170 and/or an apex of a touch-sensing electrode 160 can be located at a crossing location of the plurality of crossing locations.

In various embodiments of the present disclosure, for example, with reference to FIG. 2A, for the plurality of touch-sensing electrodes 160, the plurality of sub-touch-sensing electrodes 161 can be separated by the gaps from the plurality of first floating electrodes 163. Similarly, in the plurality of touch-driving electrodes 170, the plurality of sub-touch-driving electrodes 171 can be separated by the gaps from the plurality of second floating electrodes 173. The gaps can extend in the third and fourth directions.

Hereinafter, the second non-display area NA2 of the display device 100 will be specifically described with reference to FIGS. 3A and 3B.

Figure 3A:
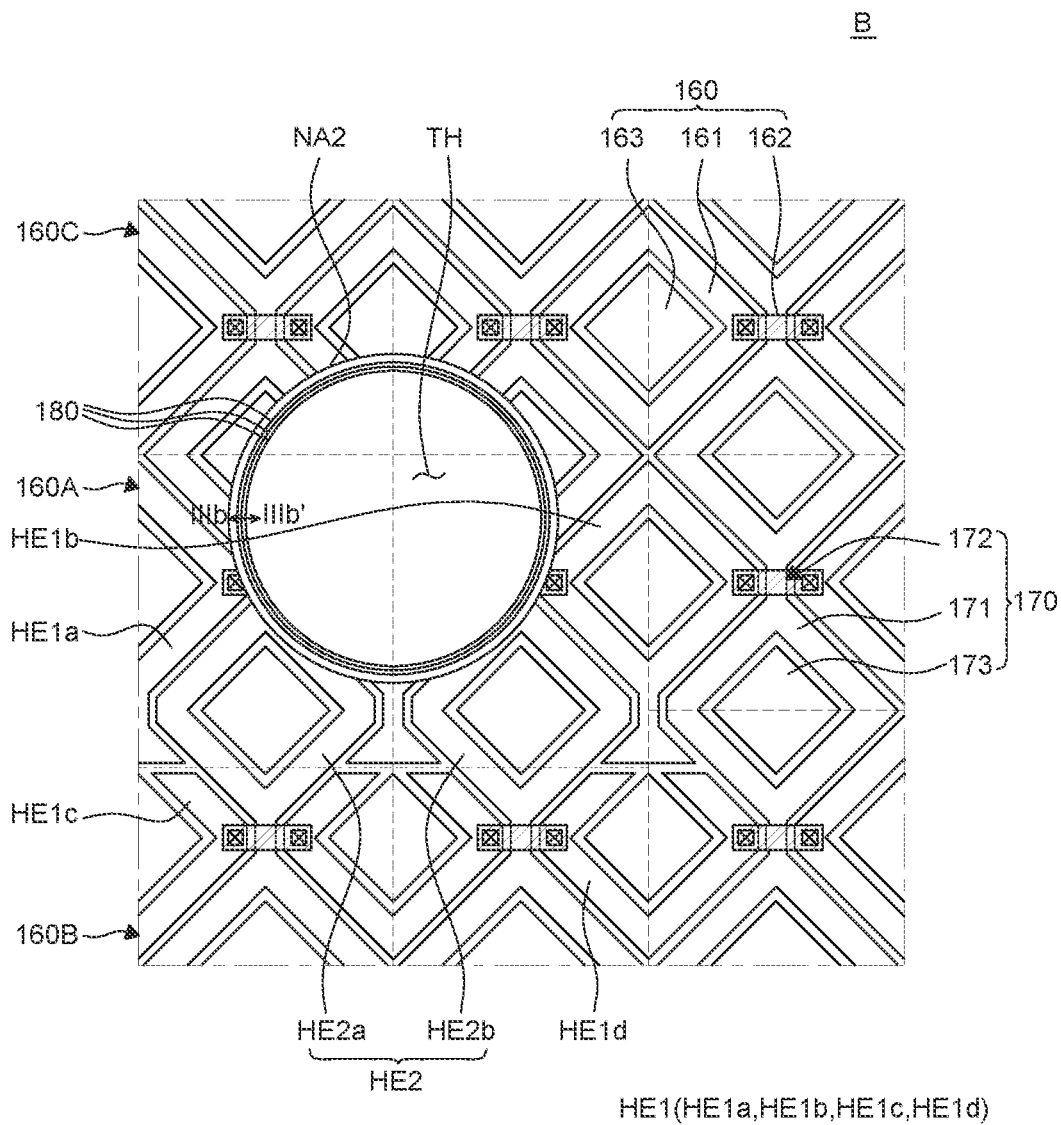
FIG. 3A is an enlarged view of part B in FIG. 1.

FIG. 3A is an enlarged view of part B in FIG. 1. FIG. 3B is a cross-sectional view taken along line IIIb-IIIb' in FIG. 3A.

Figure 3B:
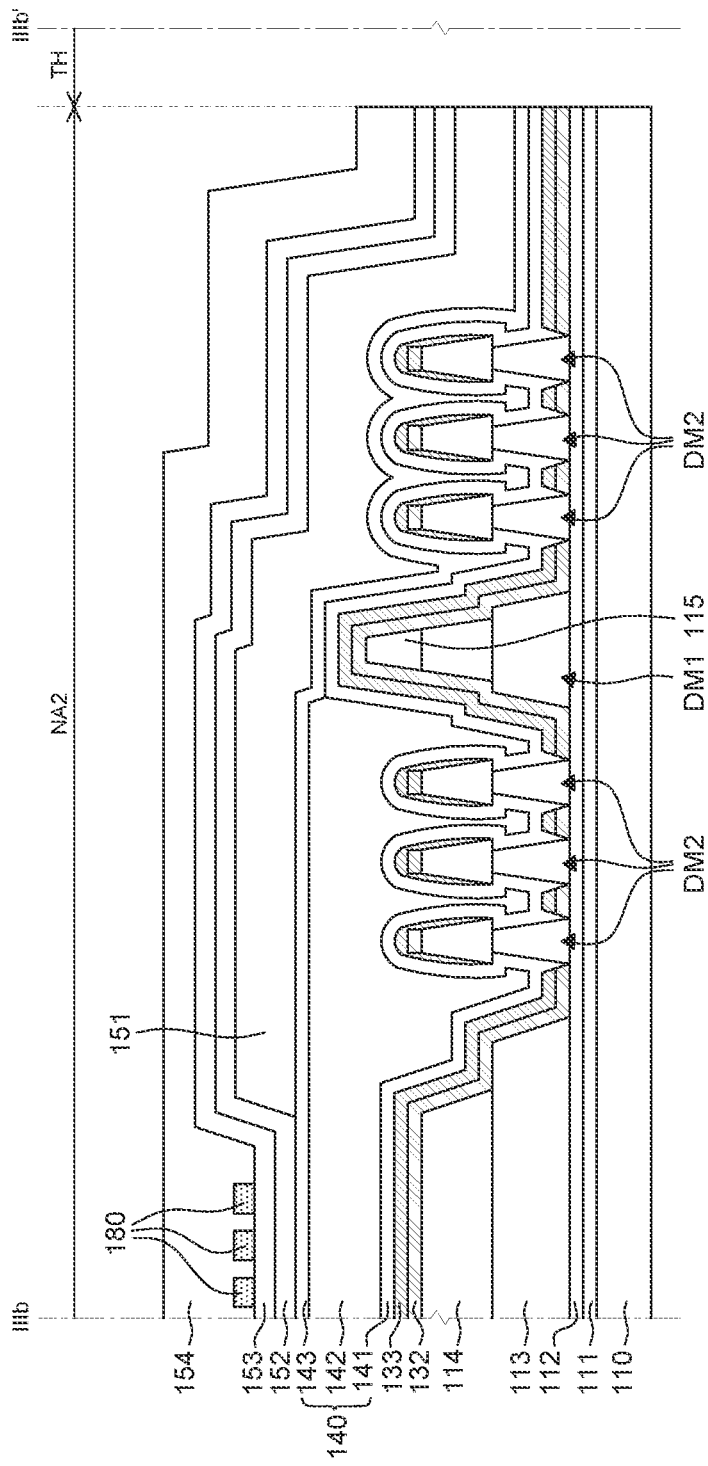
FIG. 3B is a cross-sectional view taken along line IIIb-IIIb' in FIG. 3A.

With reference to FIGS. 3A and 3B, the second non-display area NA2 is disposed in the display area AA. The second non-display area NA2 includes the through-hole TH, a plurality of dams DM1 and DM2, and connection lines 180. The second non-display area NA2 can mean the through-hole TH and a peripheral area disposed adjacent to the through-hole TH. Because of the through-hole TH, the light-emitting element 130 and the touch electrodes 160 and 170 may not be disposed in the second non-display area NA2. However, some of the metal lines, which extend from the touch electrodes 160 and 170 and are connected to the connection line 180, can be disposed on an outer periphery of the second non-display area NA2.

The through-hole TH is formed in the second non-display area NA2. The through-hole TH can physically pass through the substrate 110, the gate insulation layer 111, the first interlayer insulation layer 112, the first encapsulation layer 141, the second encapsulation layer 143, a first touch planarization layer 151, the touch buffer layer 152, the touch insulation layer 153, and the second touch planarization layer 154. The through-hole TH can be formed to correspond to a camera or an optical sensor. The light can be easily transmitted to the upper portion of the camera or optical sensor through the through-hole TH.

The plurality of dams DM1 and DM2 is disposed to surround the through-hole TH. The plurality of dams DM1 and DM2 includes a first dam DM1 and a second dam DM2.

The first dam DM1 can be formed in a shape of a closed loop that surrounds an outer periphery of the through-hole TH. The first dam DM1 can include a first layer configured as the second interlayer insulation layer 113, a second layer configured as the planarization layer 114, and a third layer configured as the bank 115. FIG. 3B illustrates the single first dam DM1. However, the present disclosure is not limited thereto. The first dam DM1 can inhibit the particle covering layer 142 from overflowing into the through-hole TH. For example, the particle covering layer 142 can be formed to the inside of the first dam DM1 from the display area AA by the first dam DM1.

The second dam DM2 can be formed in a shape of a closed loop that surrounds the outer periphery of the through-hole TH. The second dam DM2 can be provided as a plurality of second dams DM2 disposed between the first dam DM1 and the through-hole TH and between the first dam DM1 and the display area AA. The plurality of second dams DM2 can be spaced apart from one another at predetermined distances. The second dam DM2 can include the first layer configured as the second interlayer insulation layer 113, and the second layer configured as the planarization layer 114. FIG. 3B illustrates that three second dams DM2 are disposed at each of two opposite sides based on the first dam DM1. However, the present disclosure is not limited thereto.

The second dam DM2 can inhibit moisture from penetrating into the display area AA through the light-emitting layer 132. For example, the light-emitting layer 132, which is vulnerable to the penetration of moisture, can have a structure disconnected by the second dam DM2. Specifically, a top surface of the second interlayer insulation layer 113 of the second dam DM2 can have a smaller width than a bottom surface of the planarization layer 114. Therefore, the light-emitting layer 132 disposed on an upper portion of the second dam DM2 can be disconnected by the second dam DM2 without being continuously formed. In this case, the second electrode 133 on the light-emitting layer 132 also has a disconnected structure, like the light-emitting layer 132. The second electrode 133 can cover the light-emitting layer 132. In addition, the first encapsulation layer 141 on the second electrode 133 can be disposed to completely cover the disconnected light-emitting layer 132 and the disconnected second electrode 133. Therefore, even though moisture penetrates through the light-emitting layer 132 exposed to a side surface of the through-hole TH, the plurality of second dams DM2 can inhibit the penetrating moisture from moving to the display area AA. In addition, the first encapsulation layer 141 can completely cover the disconnected light-emitting layer 132 and the disconnected second electrode 133, which can more effectively suppress the penetration of moisture.

The first encapsulation layer 141 and the second encapsulation layer 143 can be in contact with each other on the upper portion of the first dam DM1. For example, the first encapsulation layer 141 and the second encapsulation layer 143 can be in complete contact with each other between the first dam DM1 and the through-hole TH. Therefore, it is possible to more effectively suppress the penetration of moisture through the through-hole TH.

The first touch planarization layer 151 can be disposed on the plurality of dams DM1 and DM2 in the second non-display area NA2. The first touch planarization layer 151 can be disposed on the second encapsulation layer 143. In addition, the first touch planarization layer 151 can be disposed in an area corresponding to a portion between the through-hole TH and the display area AA. The first touch planarization layer 151 can suppress the penetration of moisture through the through-hole TH. The first touch planarization layer 151 can be made of an organic material. For example, the first touch planarization layer 151 can be configured as a single layer or multilayer made of polyimide or photo acryl. However, the present disclosure is not limited thereto.

The touch buffer layer 152, the touch insulation layer 153, and the second touch planarization layer 154 can be sequentially disposed on the first touch planarization layer 151 while adjoining one another. Therefore, it is possible to minimize the penetration of moisture through the through-hole TH.

The connection line 180 is disposed on the touch insulation layer 153 and surrounds the through-hole TH. The connection line 180 can be disposed on the outer peripheries of the plurality of dams DM1 and DM2. The connection line 180 electrically connects the touch-sensing electrode 160 disconnected by the through-hole TH or electrically connects the touch-driving electrode 170 disconnected by the through-hole TH. Specifically, because the through-hole TH passes through the substrate 110 and the components disposed on the substrate 110, the plurality of touch electrodes 160 and 170 cannot be formed in the through-hole TH. Therefore, the connection line 180 can connect the two sub-touch-sensing electrodes 161 disposed with the through-hole TH therebetween. Alternatively, the connection line 180 can connect the two sub-touch-driving electrodes 171 with the through-hole TH interposed therebetween. FIGS. 3A and 3B illustrate three connection lines 180. However, the present disclosure is not limited thereto. For example, the number of connection lines 180 and the shape of the connection line 180 are not limited as long as the connection line 180 can connect the separated touch-sensing electrodes 160 or the separated touch-driving electrodes 170.

Meanwhile, with reference to FIG. 3A, at least one sub-touch-sensing electrode 161, which is disposed adjacent to the second non-display area NA2 among the plurality of sub-touch-sensing electrodes 161, has a shape different from shapes of the remaining sub-touch-sensing electrodes 161. Hereinafter, for convenience of description, the remaining sub-touch-sensing electrodes 161 will be referred to as the general sub-touch-sensing electrodes 161, and the sub-touch-sensing electrode 161 having a shape different from a shape of the general sub-touch-sensing electrode 161 will be referred to as a first variant electrode HE1. The general sub-touch-sensing electrode 161 can mean the sub-touch-sensing electrode 161 having the shape illustrated in FIG. 2A. In addition, as illustrated in FIG. 3A, the first variant electrode HE1 can mean the sub-touch-sensing electrode 161 having a shape different from the shape of the general sub-touch-sensing electrode 161. In this case, the first variant electrode HE1 does not mean an electrode changed in shape by being cut by the through-hole TH. For example, the first variant electrode HE1 does not mean the electrode changed in shape by the through-hole TH, but means the electrode intentionally changed in shape at a portion, which is not in contact with the second non-display area NA2, and having a shape different from the shape of the general sub-touch-sensing electrode 161.

In addition, at least one sub-touch-driving electrode 171, which is disposed adjacent to the second non-display area NA2 among the plurality of sub-touch-driving electrodes 171, has a shape different from shapes of the remaining sub-touch-driving electrodes 171. Hereinafter, for convenience of description, the remaining sub-touch-driving electrodes 171 will be referred to as the general sub-touch-driving electrodes 171, and the sub-touch-driving electrode 171 having a shape different from the shape of the general sub-touch-driving electrode 171 will be referred to as a second variant electrode HE2. The general sub-touch-driving electrode 171 can mean the sub-touch-driving electrode 171 having the shape illustrated in FIG. 2A. In addition, as illustrated in FIG. 3A, the second variant electrode HE2 can mean the sub-touch-driving electrode 171 having a shape different from the shape of the general sub-touch-driving electrode 171. In this case, the second variant electrode HE2 does not mean an electrode changed in shape by being cut by the through-hole TH. For example, the second variant electrode HE2 does not mean the electrode changed in shape by the through-hole TH, but means the electrode intentionally changed in shape at a portion, which is not in contact with the second non-display area NA2, and having a shape different from the shape of the general sub-touch-driving electrode 171.

A partial area of each of some of the plurality of touch-sensing electrodes 160 and a partial area of each of some of the plurality of touch-driving electrodes 170 can cut by the second non-display area NA2 including the through-hole TH. Therefore, in the present disclosure, some of the sub-touch-sensing electrodes 161 and some of the sub-touch-driving electrodes 171, which are disposed adjacent to the second non-display area NA2, are changed in shape and constitute the variant electrodes HE1 and HE2. Therefore, it is possible to compensate for areas of the touch electrodes 160 and 170 that are lost by the through-hole TH.

The capacitive touch sensor can detect the touch input on the basis of the mutual capacitance between the touch-sensing electrode and the touch-driving electrode. In general, as the area of the electrode increases, the mutual capacitance can increase, and sensing sensitivity of the touch can be improved. However, in case that a through-hole is formed in the display area to dispose a camera, an optical sensor, or the like, there is a problem in which the area of the electrode disposed adjacent to the through-hole is lost, and the sensing sensitivity deteriorates. For example, as the area of the electrode decreases, the amount of change in capacitance, which is generated during the touch operation, is decreased. Therefore, the amount of change in capacitance detected at the node including the electrode with the lost area decreases, which can degrade the touch performance.

Therefore, in the display device 100 according to the present disclosure, some of the sub-touch-sensing electrodes 161 and some of the sub-touch-driving electrodes 171, which are disposed adjacent to the second non-display area NA2, can constitute the variant electrodes HE1 and HE2. Therefore, the variant electrodes HE1 and HE2 can compensate for a loss of area of the node caused by the through-hole TH. Therefore, the display device 100 can suppress the degradation of the touch sensitivity.

Specifically, with reference to FIG. 3A, the plurality of touch-sensing electrodes 160 can include a first touch-sensing electrode 160A and a second touch-sensing electrode 160B that are disposed adjacent to the second non-display area NA2. The first touch-sensing electrode 160A and the second touch-sensing electrode 160B can be disposed to be adjacent to each other. In this case, the first touch-sensing electrode 160A can be the touch-sensing electrode 160 having a partial area lost by the through-hole TH, and the second touch-sensing electrode 160B can be the touch-sensing electrode 160 having no area lost by the through-hole TH. However, the present disclosure is not limited thereto.

Some of the plurality of sub-touch-sensing electrodes 161 of the first touch-sensing electrode 160A are configured as the first variant electrodes HE1. Some of the plurality of sub-touch-sensing electrodes 161 of the second touch-sensing electrode 160B are configured as the first variant electrodes HE1. Hereinafter, the first variant electrodes HE1 of the first touch-sensing electrode 160A, which are respectively disposed at left and right sides of the through-hole TH, are defined as a first-a variant electrode HE1a and a first-b variant electrode HE1b. In addition, the first-variant electrodes HE1 of the second touch-sensing electrode 160B, which are disposed adjacent to the first-a variant electrode HE1a and the first-b variant electrode HE1b in the second direction, are defined as a first-c variant electrode HE1c and a first-d variant electrode HE1d. A boundary between the first-a variant electrode HE1a and the first-c variant electrode HE1c, which are disposed adjacent to each other, can be different from a boundary between the general sub-touch-sensing electrodes 161. For example, with reference to FIG. 3A, the boundary between the general sub-touch-sensing electrodes 161, when formed by a gap, can extend in the third direction and/or the fourth direction. Meanwhile, the boundary between the first-a variant electrode HE1a and the first-c variant electrode HE1c, when formed as a gap spacing, extends in the first direction, which is intersecting to the third and fourth directions. Similarly, a boundary between the first-b variant electrode HE1b and the first-d variant electrode HE1d, when formed by a gap spacing, can extend in the first direction. In various embodiments of the present disclosure, the gap spacing can communicate with adjacent gaps extending in the third and fourth directions. For example, one end of the gap spacing can connect to a gap extending in the third direction and an opposite end of the gap spacing can connect to an adjacent gap extending in the fourth direction. In other embodiments of the present disclosure, the gap extending in the third direction and the adjacent gap extending in the fourth direction can meet at a middle of the gap spacing, and connect to the gap spacing at the middle of the gap spacing.

A length of each of the plurality of first variant electrodes HE1 in the second direction can be different from a length of the general sub-touch-sensing electrode 161 in the second direction. For example, a length of each of the first-a variant electrode HE1a and the first-b variant electrode HE1b of the first touch-sensing electrode 160A in the second direction is greater than a length of the general sub-touch-sensing electrode 161 in the second direction. In addition, a length of each of the first-c variant electrode HE1c and the first-d variant electrode HE1d of the second touch-sensing electrode 160B in the second direction can be smaller than a length of the general sub-touch-sensing electrode 161 in the second direction. In particular, based on the second direction, a sum of a length of the first-a variant electrode HE1a and a length of the first-c variant electrode HE1c can be equal to a length of the two general sub-touch-sensing electrodes 161. For example, the length of the first-a variant electrode HE1a can be relatively long, and the length of the first-c variant electrode HE1c can be relatively short. In this case, the length can mean a distance between two opposite ends in the second direction.

Meanwhile, the first variant electrode HE1 can be present between the first-a variant electrode HE1a and the first-b variant electrode HE1b and between the first-c variant electrode HE1c and the first-d variant electrode HE1d. The first variant electrode HE1 disposed between the first-a variant electrode HE1a and the first-b variant electrode HE1b can be in a state of being mostly lost by the through-hole TH. The first variant electrode HE1 disposed between the first-c variant electrode HE1c and the first-d variant electrode HE1d can be formed to have a shape similar to the shape of the first-c variant electrode HE1c and the shape of the first-d variant electrode HE1d. However, the present disclosure is not limited thereto.

The nodes can mean the points at which the plurality of touch-sensing electrodes 160 and the plurality of touch-driving electrodes 170 intersect. In addition, the nodes can be set by the areas defined by the imaginary connection lines configured to connect the upper ends of the plurality of sub-touch-sensing electrodes 161, the imaginary connection lines configured to connect the lower ends of the plurality of sub-touch-sensing electrodes 161, the imaginary connection lines configured to connect one end of each of the plurality of sub-touch-driving electrodes 171, and the imaginary connection lines configured to connect the other end of each of the plurality of sub-touch-driving electrodes 171. For example, the node can be set as an area between the dotted lines in FIG. 3A. Hereinafter, for convenience of description, the node at which an area is lost by the through-hole TH will be referred to as a loss occurrence node, and the node at which an area is not lost will be referred to as a general node.

With reference to FIG. 3A, a boundary line between some of the nodes having the through-hole TH can be different from a boundary line between other adjacent nodes. Specifically, as a length of the first-a variant electrode HE1a increases, a length of the node including the first-a variant electrode HE1a can be greater than a length of the node including the general sub-touch-sensing electrode 161. In this case, the node including the first-a variant electrode HE1a can be the loss occurrence node. For example, the length of the first-a variant electrode HE1a is relatively long, such that the area of the node including the first-a variant electrode HE1a can be expanded, and a loss of the area caused by the through-hole TH can be compensated. In particular, as the area of the node is expanded, the areas of the touch-sensing electrode 160 and the touch-driving electrode 170 included in the node can be increased. In this case, the capacitance increases as the area of the electrode increases. Therefore, even at the loss occurrence node, the sufficient amount of change in capacitance can be detected to the extent that the occurrence of touch is recognized.

The area of the loss occurrence node can be 60% or more of the area of the general node. In this case, as illustrated in FIG. 3A, the loss occurrence node can be a node that adjoins the second non-display area NA2. As illustrated in FIG. 2A, the general node can be a node completely spaced apart from the second non-display area NA2. If the area of the loss occurrence node is smaller than 60% of the area of the general node, the touch sensing sensitivity can deteriorate at the loss occurrence node. For example, the areas of the touch-sensing electrode 160 and the touch-driving electrode 170 included in the loss occurrence node can decrease to the extent that the area of the loss occurrence node decreases. Therefore, even though the touch operation is performed at the periphery of the corresponding node, the amount of change in capacitance of the touch-sensing electrode 160 and the touch-driving electrode 170 can be very small. In this case, it is difficult to detect an accurate touch coordinate.

As the length of the first-a variant electrode HE1a increases, a length of the first-c variant electrode HE1c adjacent to the first-a variant electrode HE1a decreases. In this case, the node including the first-c variant electrode HE1c can be a node at which no area is lost. In addition, the area of the node including the first-c variant electrode HE1c can be 60% or more of the area of the general node. Therefore, it is possible to suppress the degradation of the touch sensing sensitivity even though the length of the first-c variant electrode HE1c relatively decreases.

The first-b variant electrode HE1b is configured to be similar to the first-a variant electrode HE1a, and the first-d variant electrode HE1d is configured to be similar to the first-c variant electrode HE1c. Therefore, the repeated description of the first-b variant electrode HE1b and the first-d variant electrode HE1d will be omitted. Meanwhile, some nodes at which the first-b variant electrodes HE1b are disposed can be nodes at which no area is lost. For example, the area of the node corresponding to one side of the first-b variant electrode HE1b is lost by the through-hole TH, but the area of the node corresponding to the other side is not lost. Therefore, the node corresponding to the other side of the first-b variant electrode HE1b can be set to the general node.

A third touch-sensing electrode 160C can be disposed on an upper portion of the first touch-sensing electrode 160A. In addition, a loss of area caused by the through-hole TH can occur in the third touch-sensing electrode 160C. However, a loss of area in the third touch-sensing electrode 160C can be smaller than a loss of area in the first touch-sensing electrode 160A. In addition, the area of the loss occurrence node corresponding to the third touch-sensing electrode 160C can be 60% or more of the area of the general node. Therefore, at the nodes corresponding to the third touch-sensing electrode 160C and the plurality of touch-driving electrodes 170 intersecting the third touch-sensing electrode 160C, the touch operation can be easily detected without compensating for the area by using the variant electrode.

With reference to FIG. 3A, some of the plurality of sub-touch-driving electrodes 171 of the plurality of touch-driving electrodes 170 are configured as the second variant electrodes HE2. Hereinafter, the second variant electrodes HE2, which are respectively disposed at a left lower side and a right lower side of the through-hole TH, are defined as a second-a variant electrode HE2a and a second-b variant electrode HE2b.

The second-a variant electrode HE2a is disposed adjacent to the first-a variant electrode HE1a. In particular, an outer peripheral shape of the second-a variant electrode HE2a can correspond to an outer peripheral shape of the first-a variant electrode HE1a. For example, as the shape of the first-a variant electrode HE1a is changed, the shape of the second-a variant electrode HE2a adjacent to the first-a variant electrode HE1a can also be changed. The second-b variant electrode HE2b can be disposed adjacent to the first-b variant electrode HE1b. In particular, an outer peripheral shape of the second-b variant electrode HE2b can correspond to an outer peripheral shape of the first-b variant electrode HE1b. For example, as the shape of the first-b variant electrode HE1b is changed, the shape of the second-b variant electrode HE2b adjacent to the first-b variant electrode HE1b can also be changed.

Meanwhile, the positions and structures of the through-hole TH, the second non-display area NA2, and the variant electrodes HE1 and HE2 illustrated in FIG. 3A are just one example for explaining the present disclosure, and the present disclosure is not limited thereto. For example, the positions and structures of the above-mentioned components can vary depending on the design of the display device 100.

In the display device 100 according to the present disclosure, at least one of the plurality of sub-touch-sensing electrodes 161 adjacent to the second non-display area NA2 is configured as the first variant electrode HE1. In addition, at least one of the plurality of sub-touch-driving electrodes 171 adjacent to the second non-display area NA2 is configured as the second variant electrode HE2. Therefore, it is possible to suppress the degradation of the touch sensing sensitivity at the node at which the area is lost by the through-hole TH.

Specifically, a length of one of the adjacent first variant electrodes HE1 can be relatively long, and a length of the other of the adjacent first variant electrodes HE1 can be relatively short. In this case, the touch-sensing electrode 160 including the first variant electrode HE1 formed to be relatively long can be an electrode having a loss of area caused by the through-hole TH. In addition, the touch-sensing electrode 160 including the first variant electrode HE1 formed to be relatively short can be an electrode in which no area is lost by the through-hole TH or the area is relatively less lost. For example, as illustrated in FIG. 3A, the areas of some of the sub-touch-sensing electrodes 161 of the first touch-sensing electrode 160A can be expanded to the area of the second touch-sensing electrode 160B adjacent to the first touch-sensing electrode 160A. Therefore, it is possible to compensate for a loss of area occurring on the first touch-sensing electrode 160A. In particular, as the area of the sub-touch-sensing electrode 161 at the node adjacent to the through-hole TH is expanded, the amount of change in capacitance, which can be detected at the corresponding node, can increase. Therefore, it is possible to improve the accuracy of the touch sensing of the display device 100.

Figure 4:
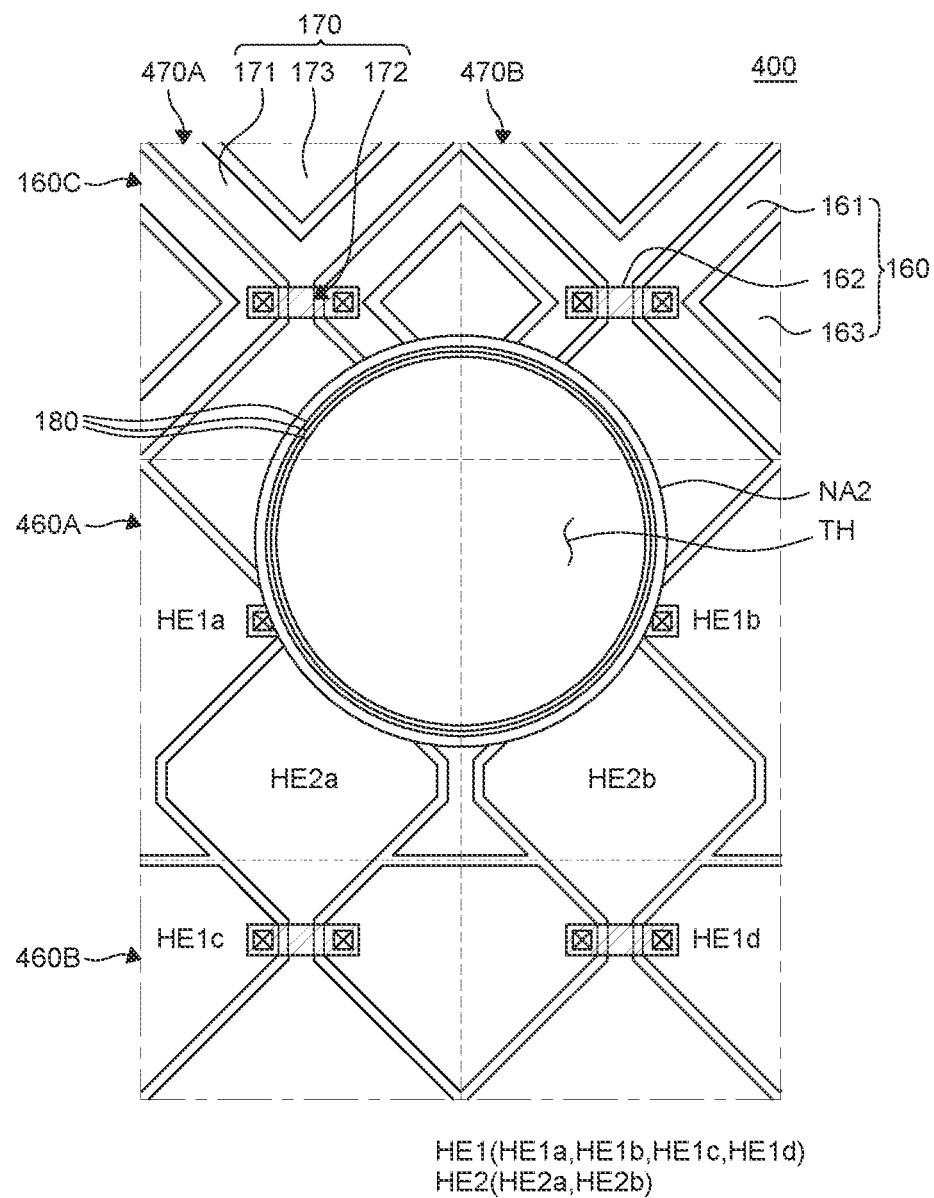
FIG. 4 is a top plan view of a display device according to another example embodiment of the present disclosure.

FIG. 4 is a top plan view of a display device according to another example embodiment of the present disclosure. FIG. 4 can be an enlarged top plan view of a partial area including the second non-display area NA2. A display device 400 in FIG. 4 is substantially identical in configuration to the display device 100 illustrated in FIGS. 1 to 3B, except for floating electrodes 163 and 173. Therefore, repeated descriptions of the identical components will be omitted.

With reference to FIG. 4, the display device 400 includes the plurality of touch-sensing electrodes 160 extending in the first direction, and the plurality of touch-driving electrodes 170 extending in the second direction.

The plurality of touch-sensing electrodes 160 can include a first touch-sensing electrode 460A and a second touch-sensing electrode 460B that are disposed adjacent to each other. In this case, the first touch-sensing electrode 460A can be the touch-sensing electrode 160 having a partial area lost by the through-hole TH, and the second touch-sensing electrode 460B can be the touch-sensing electrode 160 having no area lost by the through-hole TH. However, the present disclosure is not limited thereto.

Some of the plurality of sub-touch-sensing electrodes 161 of the first touch-sensing electrode 460A are configured as the first variant electrodes HE1. Some of the plurality of sub-touch-sensing electrodes 161 of the second touch-sensing electrode 460B are configured as the first variant electrodes HE1. Specifically, the first touch-sensing electrode 460A includes the first-a variant electrode HE1a and the first-b variant electrode HE1b, and the second touch-sensing electrode 460B includes the first-c variant electrode HE1c and the first-d variant electrode HE1d. In addition, the first touch-sensing electrode 460A can further include another first variant electrode HE1 disposed between the first-a variant electrode HE1a and the first-b variant electrode HE1b. In addition, the second touch-sensing electrode 460B can further include another first variant electrode HE1 disposed between the first-c variant electrode HE1c and the first-d variant electrode HE1d.

The plurality of touch-driving electrodes 170 can include a first touch-driving electrode 470A and a second touch-driving electrode 470B that are disposed adjacent to each other. Both the first touch-driving electrode 470A and the second touch-driving electrode 470B can each be the touch-driving electrode 170 in which a partial area is lost by the through-hole TH. However, the present disclosure is not limited thereto.

Some of the plurality of sub-touch-driving electrodes 171 of the first touch-driving electrode 470A can be configured as the second variant electrodes HE2. Some of the plurality of sub-touch-driving electrodes 171 of the second touch-driving electrode 470B are configured as the second variant electrodes HE2. Specifically, the first touch-driving electrode 470A includes the second-a variant electrode HE2a, and the second touch-driving electrode 470B includes the second-b variant electrode HE2b.

The first floating electrode 163 is disposed only in some of the plurality of sub-touch-sensing electrodes 161. For example, the first floating electrode 163 can be disposed only in the general sub-touch-sensing electrode 161 except for the first variant electrode HE1 among the plurality of sub-touch-sensing electrodes 161. In addition, the first floating electrode 163 can be disposed only in some of the general sub-touch-sensing electrodes 161. Specifically, the first floating electrode 163 can be disposed only in the sub-touch-sensing electrode 161 having no loss of area among the general sub-touch-sensing electrodes 161 or disposed only in the sub-touch-sensing electrode 161 in which a loss of area is small.

The second floating electrode 173 is disposed only in some of the plurality of sub-touch-driving electrodes 171. For example, the second floating electrode 173 can be disposed only in the general sub-touch-driving electrode 171 except for the second variant electrode HE2 among the plurality of sub-touch-driving electrodes 171. In addition, the second floating electrode 173 can be disposed only in some of the general sub-touch-driving electrodes 171. Specifically, the second floating electrode 173 can be disposed only in the sub-touch-driving electrode 171 having no loss of area among the general sub-touch-driving electrodes 171 or disposed only in the sub-touch-driving electrode 171 in which a loss of area is small.

In the display device 400 according to another example embodiment of the present disclosure, at least one of the plurality of sub-touch-sensing electrodes 161 adjacent to the second non-display area NA2 is configured as the first variant electrode HE1. In addition, at least one of the plurality of sub-touch-driving electrodes 171 adjacent to the second non-display area NA2 is configured as the second variant electrode HE2. Therefore, it is possible to compensate for a loss of area caused by the through-hole TH and suppress the degradation of the touch sensing sensitivity.

The first floating electrode 163 is disposed only in some of the plurality of sub-touch-sensing electrodes 161, and the second floating electrode 173 is disposed only in some of the plurality of sub-touch-driving electrodes 171. Therefore, it is possible to increase the effective area of the sub-touch-sensing electrode 161 or the sub-touch-driving electrode 171 in which the floating electrodes 163 and 173 are not disposed. Therefore, the touch sensing sensitivity of the display device 400 can be improved.

Specifically, as illustrated in FIG. 4, the first variant electrode HE1 does not include the first floating electrode 163. In this case, the capacitance increases as the area increases. Therefore, the effective area of the first variant electrode HE1 can increase, and the amount of change in capacitance can increase. In particular, the first variant electrode HE1 is disposed in the touch-sensing electrode 160 having a loss of area caused by the through-hole TH or disposed in the touch-sensing electrode 160 in which a partial area is reduced to compensate for the area of the adjacent touch-sensing electrode 160. Therefore, as the effective area of the first variant electrode HE1 increases, the loss of area caused by the through-hole TH can be more effectively compensated. In addition, the increase in effective area of the first variant electrode HE1 can compensate for the reduction in partial area of the touch-sensing electrode 160.

The second variant electrode HE2 does not include the second floating electrode 173. Therefore, the effective area of the second variant electrode HE2 can increase, and the amount of change in capacitance can increase. In particular, the second variant electrode HE2 is disposed in the touch-driving electrode 170 having a loss of area caused by the through-hole TH. Therefore, as the effective area of the second variant electrode HE2 increases, the loss of area caused by the through-hole TH can be more effectively compensated.

In particular, as illustrated in FIG. 4, the second floating electrode 173 is not formed in the sub-touch-driving electrodes 171 disposed at a left upper end and a right upper end of the through-hole TH. For example, the second floating electrode 173 is not formed in the sub-touch-driving electrode 171 in which the area is greatly lost by the through-hole TH. Therefore, the loss of area caused by the through-hole TH can be compensated as the effective area of the corresponding sub-touch-driving electrode 171 increases. In addition, the second floating electrode 173 is not formed in the sub-touch-driving electrode 171 disposed at the same node as the first-c variant electrode HE1c nor formed in the sub-touch-driving electrode 171 disposed at the same node as the first-d variant electrode HE1d. In this case, the node at which the first-c variant electrode HE1c and the first-d variant electrode HE1d are disposed can be a node reduced in area. Therefore, it is possible to increase the effective area of the sub-touch-driving electrode 171 included in the node reduced in area in comparison with the general node, thereby compensating for the reduction in area of the node.

Also, with reference to FIG. 4, the boundary between the first-a variant electrode HE1a and the first-c variant electrode HE1c, when formed as a gap spacing, extends in the first direction, which is intersecting to the third and fourth directions. Similarly, a boundary between the first-b variant electrode HE1b and the first-d variant electrode HE1d, when formed by a gap spacing, can extend in first direction.

Figure 5:
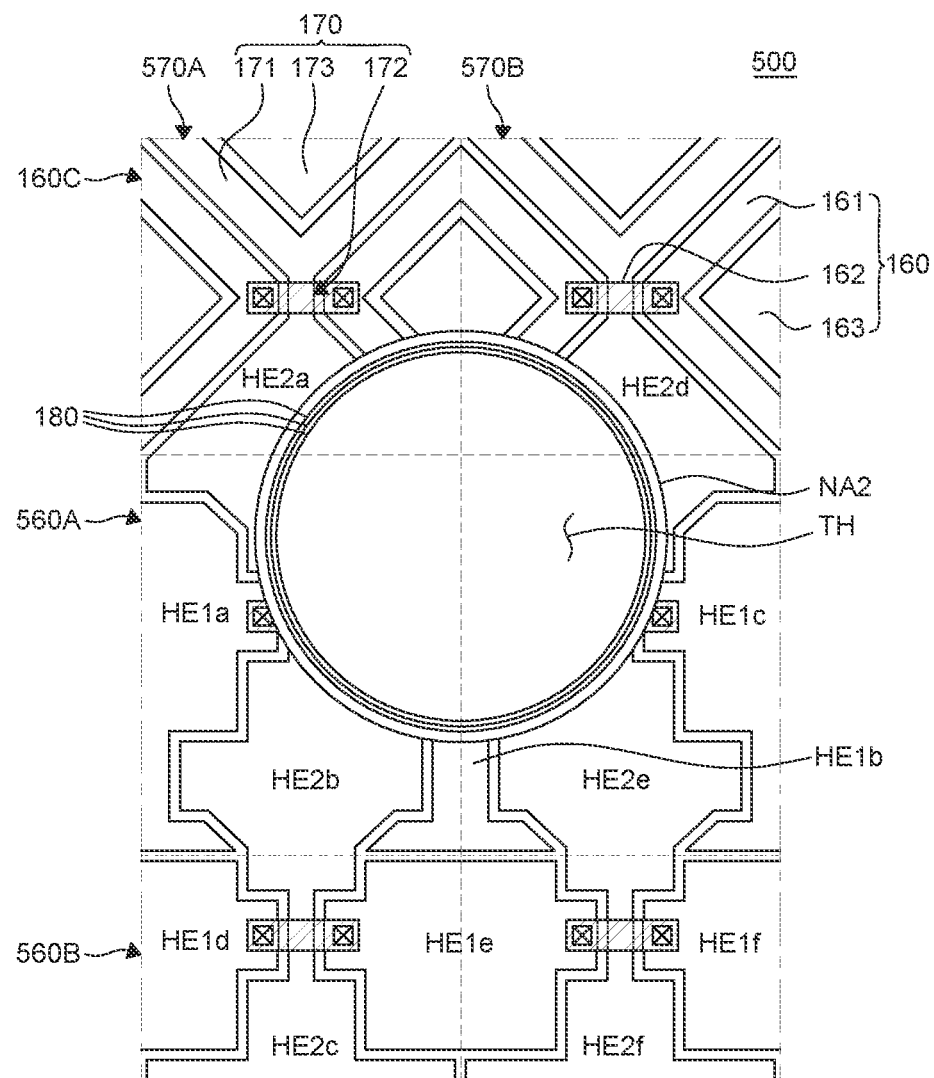
FIG. 5 is a top plan view of a display device according to still another example embodiment of the present disclosure.

FIG. 5 is a top plan view of a display device according to still another example embodiment of the present disclosure. FIG. 5 can be an enlarged top plan view of a partial area including the second non-display area NA2. A display device 500 in FIG. 5 is substantially identical in configuration to the display device 400 illustrated in FIG. 4, except for the variant electrodes HE1 and HE2. Therefore, repeated descriptions of the identical components will be omitted.

With reference to FIG. 5, the display device 500 includes the plurality of touch-sensing electrodes 160 extending in the first direction, and the plurality of touch-driving electrodes 170 extending in the second direction.

The plurality of touch-sensing electrodes 160 can include a first touch-sensing electrode 560A and a second touch-sensing electrode 560B that are disposed adjacent to each other. In this case, the first touch-sensing electrode 560A can be the touch-sensing electrode 160 having a partial area lost by the through-hole TH, and the second touch-sensing electrode 560B can be the touch-sensing electrode 160 having no area lost by the through-hole TH. However, the present disclosure is not limited thereto.

Some of the plurality of sub-touch-sensing electrodes 161 of the first touch-sensing electrode 560A are configured as the first variant electrodes HE1. Some of the plurality of sub-touch-sensing electrodes 161 of the second touch-sensing electrode 560B are configured as the first variant electrodes HE1. Specifically, the first touch-sensing electrode 560A includes the first-a variant electrode HE1a, the first-b variant electrode HE1b, and the first-c variant electrode HE1c. The second touch-sensing electrode 560B includes the first-d variant electrode HE1d, a first-e variant electrode HE1e, and a first-f variant electrode HE1f. All the first variant electrodes HE1 do not include the first floating electrode 163.

The plurality of touch-driving electrodes 170 can include a first touch-driving electrode 570A and a second touch-driving electrode 570B that are disposed adjacent to each other. Both the first touch-driving electrode 570A and the second touch-driving electrode 570B can each be the touch-driving electrode 170 in which a partial area is lost by the through-hole TH. However, the present disclosure is not limited thereto.

Some of the plurality of sub-touch-driving electrodes 171 of the first touch-driving electrode 570A can be configured as the second variant electrodes HE2. Some of the plurality of sub-touch-driving electrodes 171 of the second touch-driving electrode 570B are configured as the second variant electrodes HE2. Specifically, the first touch-driving electrode 570A includes the second-a variant electrode HE2a, the second-b variant electrode HE2b, a second-c variant electrode HE2c, and the second touch-driving electrode 570B includes a second-d variant electrode HE2d, a second-e variant electrode HE2e, and a second-f variant electrode HE2f. All the second variant electrodes HE2 do not include the second floating electrode 173.

In the display device 500 according to still another example embodiment of the present disclosure, at least one of the plurality of sub-touch-sensing electrodes 161 adjacent to the second non-display area NA2 is configured as the first variant electrode HE1. In addition, at least one of the plurality of sub-touch-driving electrodes 171 adjacent to the second non-display area NA2 is configured as the second variant electrode HE2. Therefore, it is possible to compensate for a loss of area caused by the through-hole TH and suppress the degradation of the touch sensing sensitivity.

The shapes of the outer peripheries of the first variant electrode HE1 and the second variant electrode HE2, which are disposed adjacent to each other, can correspond to each other. In particular, both the first variant electrode HE1 and the second variant electrode HE2 can have shapes completely different from the shapes of the general sub-touch-sensing electrode 161 and the general sub-touch-driving electrode 171. Therefore, at one node, the first variant electrode HE1 and the second variant electrode HE2 can have similar area ratios. Therefore, the accuracy of touch sensing can be further improved.

Both the variant electrodes HE1 and HE2 do not include the floating electrodes 163 and 173. Therefore, the effective areas of the variant electrodes HE1 and HE2 can be increased. Therefore, the touch sensing sensitivity of the display device 500 can be improved.

Also, with reference to FIG. 5, the boundary between the first-a variant electrode HE1a and the first-c variant electrode HE1c, when formed as a gap spacing, extends in the first direction, which is intersecting to the third and fourth directions. Similarly, a boundary between the first-b variant electrode HE1b and the first-d variant electrode HE1d, when formed by a gap spacing, can extend in the first direction.

The example embodiments of the present disclosure can also be described as follows:

According to an aspect of the present disclosure, a display device includes: a substrate including a display area and a non-display area in the display area; a plurality of light-emitting elements disposed in the display area; an encapsulation unit covering the plurality of light-emitting elements; a plurality of touch-sensing electrodes on the encapsulation unit in the display area and extending in a first direction; and a plurality of touch-driving electrodes on the encapsulation unit in the display area and extending in a second direction different from the first direction, in which the plurality of touch-sensing electrodes includes a plurality of sub-touch-sensing electrodes spaced apart from each other, and in which at least one sub-touch-sensing electrode, which is adjacent to the non-display area among the plurality of sub-touch-sensing electrodes, is configured as a first variant electrode having a shape different from a shape of the remaining sub-touch-sensing electrode.

The first variant electrode and the remaining sub-touch-sensing electrode have different lengths in the second direction.

The plurality of touch-sensing electrodes can include a first touch-sensing electrode and a second touch-sensing electrode that are disposed adjacent to each other in an area adjacent to the non-display area. The first variant electrode of the first touch-sensing electrode and the first variant electrode of the second touch-sensing electrode can be disposed adjacent to each other in the second direction.

A length of the first variant electrode of the first touch-sensing electrode in the second direction can be greater than a length of the remaining sub-touch-sensing electrode in the second direction. A length of the first variant electrode of the second touch-sensing electrode in the second direction can be smaller than a length of the remaining sub-touch-sensing electrode in the second direction.

The plurality of touch-driving electrodes can include a plurality of sub-touch-driving electrodes spaced apart from each other. At least one sub-touch-driving electrode, which is adjacent to the non-display area among the plurality of sub-touch-driving electrodes, can be configured as a second variant electrode having a shape different from a shape of the remaining sub-touch-driving electrode.

The plurality of touch-sensing electrodes can further include a plurality of bridge electrodes configured to electrically connect the plurality of sub-touch-sensing electrodes. The plurality of touch-driving electrodes can further include a plurality of connection parts configured to connect the plurality of sub-touch-driving electrodes and integrated with the plurality of sub-touch-driving electrodes. The plurality of bridge electrodes and the plurality of connection parts can be disposed to overlap each other.

The first variant electrode of the plurality of touch-sensing electrodes and the second variant electrode of the plurality of touch-driving electrodes can be disposed adjacent to each other.

A shape of an outer periphery of the first variant electrode can correspond to a shape of an outer periphery of the second variant electrode adjacent to the first variant electrode.

The display device can further include a plurality of first floating electrodes disposed in the plurality of sub-touch-sensing electrodes and electrically separated from the plurality of sub-touch-sensing electrodes; and a plurality of second floating electrodes disposed in the plurality of sub-touch-driving electrodes and electrically separated from the plurality of sub-touch-driving electrodes.

The plurality of first floating electrodes can be disposed in some of the plurality of sub-touch-sensing electrodes, and the plurality of second floating electrodes can be disposed in some of the plurality of sub-touch-driving electrodes.

The plurality of first floating electrodes can be disposed in the remaining sub-touch-sensing electrode except for the first variant electrode among the plurality of sub-touch-sensing electrodes.

The plurality of second floating electrodes can be disposed in the remaining sub-touch-driving electrode except for the second variant electrode among the plurality of sub-touch-driving electrodes.

The display device can further include a through-hole disposed to pass through the substrate in the non-display area.

At least one of the plurality of touch-sensing electrodes and the plurality of touch-driving electrodes can be separated by the through-hole, and the separated touch-sensing electrodes or the separated touch-driving electrodes can be electrically connected by a connection line disposed along an outer periphery of the through-hole.

According to another aspect of the present disclosure, a display device includes: a substrate including a display area and a non-display area; a plurality of light-emitting elements disposed in the display area; a plurality of touch-sensing electrodes in the display area and extending in a first direction; and a plurality of touch-driving electrodes in the display area and extending in a second direction different from the first direction, wherein the plurality of touch-sensing electrodes are separated from the plurality of touch-driving electrodes by gaps extending in directions different from the first direction and the second direction, and wherein the at least two adjacent touch-sensing electrodes among the plurality of touch-sensing electrodes are separated by a boundary extending in the first direction.

For example, at least one first gap of the gaps separating the plurality of touch-sensing electrodes and the plurality of touch-driving electrodes extends in a third direction, and at least one second gap of the gaps separating the plurality of touch-sensing electrodes and the plurality of touch-driving electrodes extends in a fourth direction.

For example, the third direction and the fourth direction are perpendicular to each other.

For example, the boundary includes a gap spacing.

For example, the gap spacing connects to the at least one first gap and the at least one second gap.

For example, the at least two adjacent touch-sensing electrodes include a first touch-sensing electrode including a first variant electrode and a second touch-sensing electrode including a second variant electrode, and the boundary separates the first variant electrode and the second variant electrode.

Although the example embodiments of the present disclosure have been described in detail with reference to the accompanying drawings, the present disclosure is not limited thereto and can be embodied in many different forms without departing from the technical concept of the present disclosure. Therefore, the example embodiments of the present disclosure are provided for illustrative purposes only but not intended to limit the technical concept of the present disclosure. The scope of the technical concept of the present disclosure is not limited thereto. Therefore, it should be understood that the above-described example embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device comprising:
   a substrate including a display area and a non-display area, the non-display area disposed in the display area;
   a plurality of light-emitting elements disposed in the display area;
   an encapsulation unit covering the plurality of light-emitting elements;
   a plurality of touch-sensing electrodes on the encapsulation unit in the display area and extending in a first direction; and
   a plurality of touch-driving electrodes on the encapsulation unit in the display area and extending in a second direction different from the first direction,
   wherein the plurality of touch-sensing electrodes include a plurality of sub-touch-sensing electrodes spaced apart from each other, and
   wherein at least one sub-touch-sensing electrode, which is adjacent to the non-display area among the plurality of sub-touch-sensing electrodes, is configured as a first variant electrode having a shape different from a shape of a remaining sub-touch-sensing electrode except for the at least one sub-touch-sensing electrode among the plurality of sub-touch-sensing electrodes.

2. The display device of claim 1, wherein the first variant electrode and the remaining sub-touch-sensing electrode have different lengths in the second direction.

3. The display device of claim 2, wherein the plurality of touch-sensing electrodes include a first touch-sensing electrode and a second touch-sensing electrode that are disposed adjacent to each other in the display area adjacent to the non-display area, and wherein the first variant electrode of the first touch-sensing electrode and the first variant electrode of the second touch-sensing electrode are disposed adjacent to each other in the second direction.

4. The display device of claim 3, wherein a length of the first variant electrode of the first touch-sensing electrode in the second direction is greater than a length of the remaining sub-touch-sensing electrode in the second direction, and wherein a length of the first variant electrode of the second touch-sensing electrode in the second direction is smaller than a length of the remaining sub-touch-sensing electrode in the second direction.

5. The display device of claim 1, wherein the plurality of touch-driving electrodes include a plurality of sub-touch-driving electrodes spaced apart from each other, and wherein at least one sub-touch-driving electrode, which is adjacent to the non-display area among the plurality of sub-touch-driving electrodes, is configured as a second variant electrode having a shape different from a shape of a remaining sub-touch-driving electrode except for the at least one sub-touch-driving electrode among the plurality of sub-touch-driving electrodes.

6. The display device of claim 5, wherein the plurality of touch-sensing electrodes further include a plurality of bridge electrodes configured to electrically connect the plurality of sub-touch-sensing electrodes, wherein the plurality of touch-driving electrodes further include a plurality of connection parts configured to connect the plurality of sub-touch-driving electrodes and integrated with the plurality of sub-touch-driving electrodes, and wherein the plurality of bridge electrodes and the plurality of connection parts are disposed to overlap each other.

7. The display device of claim 5, wherein the first variant electrode of the plurality of touch-sensing electrodes and the second variant electrode of the plurality of touch-driving electrodes are disposed adjacent to each other.

8. The display device of claim 7, wherein a shape of an outer periphery of the first variant electrode corresponds to a shape of an outer periphery of the second variant electrode adjacent to the first variant electrode.

9. The display device of claim 5, further comprising:
a plurality of first floating electrodes disposed in the plurality of sub-touch-sensing electrodes and electrically separated from the plurality of sub-touch-sensing electrodes; and
a plurality of second floating electrodes disposed in the plurality of sub-touch-driving electrodes and electrically separated from the plurality of sub-touch-driving electrodes.

10. The display device of claim 9, wherein the plurality of first floating electrodes are disposed in some of the plurality of sub-touch-sensing electrodes, and the plurality of second floating electrodes are disposed in some of the plurality of sub-touch-driving electrodes.

11. The display device of claim 9, wherein the plurality of first floating electrodes are disposed in the remaining sub-touch-sensing electrode.

12. The display device of claim 9, wherein the plurality of second floating electrodes are disposed in the remaining sub-touch-driving electrode.

13. The display device of claim 1, further comprising:
a through-hole disposed to pass through the substrate in the non-display area.

14. The display device of claim 13, wherein at least one of the plurality of touch-sensing electrodes and the plurality of touch-driving electrodes is separated by the through-hole, and wherein the separated touch-sensing electrodes or the separated touch-driving electrodes are electrically connected by a connection line disposed along an outer periphery of the through-hole.

15. A display device comprising:
a substrate including a display area and a non-display area;
a plurality of light-emitting elements disposed in the display area;
a plurality of touch-sensing electrodes in the display area and extending in a first direction; and
a plurality of touch-driving electrodes in the display area and extending in a second direction different from the first direction,
wherein the plurality of touch-sensing electrodes are separated from the plurality of touch-driving electrodes by gaps extending in directions different from the first direction and the second direction, and
wherein at least two adjacent touch-sensing electrodes among the plurality of touch-sensing electrodes are separated by a boundary extending in the first direction.

16. The display device of claim 15, wherein at least one first gap of the gaps separating the plurality of touch-sensing electrodes and the plurality of touch-driving electrodes extends in a third direction, and at least one second gap of the gaps separating the plurality of touch-sensing electrodes and the plurality of touch-driving electrodes extends in a fourth direction.

17. The display device of claim 16, wherein the third direction and the fourth direction are perpendicular to each other.

18. The display device of claim 16, wherein the boundary includes a gap spacing.

19. The display device of claim 18, wherein the gap spacing connects to the at least one first gap and the at least one second gap.

20. The display device of claim 15, wherein the at least two adjacent touch-sensing electrodes include a first touch-sensing electrode including a first variant electrode and a second touch-sensing electrode including a second variant electrode, and wherein the boundary separates the first variant electrode and the second variant electrode.

* * * * *